United States Patent
Enz et al.

(10) Patent No.: US 11,226,753 B2
(45) Date of Patent: Jan. 18, 2022

(54) ADAPTIVE NAMESPACES FOR MULTIPATH REDUNDANCY IN CLUSTER BASED COMPUTING SYSTEMS

(71) Applicant: OVH US LLC, Newark, DE (US)

(72) Inventors: Michael Enz, Fargo, ND (US); Ashwin Kamath, Cedar Park, TX (US); Rukhsana Ansari, San Jose, CA (US)

(73) Assignee: OVH US LLC, Newark, DE (US)

( * ) Notice: Subject to any disclaimer, the term of this patent is extended or adjusted under 35 U.S.C. 154(b) by 300 days.

(21) Appl. No.: 16/406,326

(22) Filed: May 8, 2019

(65) Prior Publication Data
US 2019/0354302 A1    Nov. 21, 2019

Related U.S. Application Data

(60) Provisional application No. 62/673,525, filed on May 18, 2018.

(51) Int. Cl.
*G06F 3/06* (2006.01)
*H04L 29/08* (2006.01)

(52) U.S. Cl.
CPC ............ *G06F 3/0637* (2013.01); *G06F 3/067* (2013.01); *G06F 3/0617* (2013.01); *G06F 3/0622* (2013.01); *G06F 3/0634* (2013.01); *G06F 3/0644* (2013.01); *G06F 3/0659* (2013.01); *G06F 3/0664* (2013.01); *H04L 67/1097* (2013.01)

(58) Field of Classification Search
CPC .... G06F 3/0637; G06F 3/0617; G06F 3/0622; G06F 3/0634; G06F 3/0644; G06F 3/0659; G06F 3/0664; G06F 3/067; H04L 67/1097

USPC ................................................... 714/6, 38.1
See application file for complete search history.

(56) References Cited

U.S. PATENT DOCUMENTS

| | | | | |
|---|---|---|---|---|
| 10,592,128 | B1 * | 3/2020 | Natanzon | G06F 11/1456 |
| 2009/0119544 | A1 * | 5/2009 | Creamer | G06F 11/3476 |
| | | | | 714/38.1 |

(Continued)

OTHER PUBLICATIONS

"Multipath I/O", Wikipedia, last edited May 10, 2017, retrieved from <https://en.wikipedia.org/wiki/Multipath_I/O>, on Apr. 27, 2018, 1 pg.

(Continued)

*Primary Examiner* — Prabodh M Dharia
(74) *Attorney, Agent, or Firm* — BCF LLP

(57) ABSTRACT

Methods, systems, and apparatuses for a high availability (HA) storage cluster comprising a switch, a set of storage resources, and a set of nodes. Each node includes an HA module. The HA module maintains a real storage object representing a storage resource that provides an interface for accessing the storage resource. The HA module maintains a ghost storage object corresponding to the real storage object. The ghost storage object is configured to return an error in response to a call to the interface when the command is an I/O command and return a valid path when the command is a discovery command, connect command, or namespace ID command. When the node owns the storage resource, the interface of the real storage object is called to execute the command. Otherwise, the interface of the ghost storage object is called to respond to the command.

21 Claims, 10 Drawing Sheets

(56) References Cited

U.S. PATENT DOCUMENTS

2019/0334990 A1* 10/2019 Enz ..................... H04L 49/555
2021/0042273 A1* 2/2021 Testardi ................ G06F 16/196

OTHER PUBLICATIONS

"Linux DM Multipath", Wikipedia, last edited Nov. 12, 2016, retrieved from <https://en.wikipedia.org/wiki/Linux_DM_Multipath>, on Apr. 27, 2018, 4 pgs.

1.2. Overview of DM Multipath, Red Hat Portal, 2018, retrieved from https://access.redhat.com/documentation/en-us/red_hat_enterprise_linux/7/html/dm_multip . . . , Apr. 27, 2018, 3 pgs.

Multipath Management API Version 1.1, SNIA Technical Position, SNIA Advancing storage & Information technology, Mar. 8, 2010, 121 pgs.

Kudryavtsev, Andrey, An Introduction to Dual-Port NVMe, IT Peer Network, Mar. 31, 2016, retrieved from <https://itpeernetwork.intel.com/an-introduction-to-dual-port-nvme-ssd/>, 6 pgs.

Coughlin, Tom, NVMe Storage Goes Mainstream, retrieved from <https://www.forbes.com/sites/tomcouglin/2017/08/10/nvme-storage-goes-mainstream/>, Aug. 10, 2017, 6 pgs.

Supermicro NVMe Platforms, SuperStorage Solutions, Product Information, 2018, retrieved from <https://www.supermicro.com/products/info/NVMe.cfm, Apr. 27, 2018, 20 pgs.

NVM Express over Fabrics 1.0, Revision 1.0, Jun. 5, 2016, NVM Express Workgroup c/o Virtual, Inc., Wakefield, MA, retrieved from <http://nvmexpress.org>, 49 pgs.

Hellwig, Christoph, Past and present of the Linux NVMe driver, Storage Developer Conference, Santa Clara, 2017, 32 pgs.

\* cited by examiner

ADAPTIVE NAMESPACES FOR MULTIPATH REDUNDANCY IN CLUSTER BASED COMPUTING SYSTEMS

RELATED APPLICATION(S)

This application claims a benefit of priority under 35 U.S.C. § 119(e) from the filing date of U.S. Provisional Application No. 62/673,525, filed on May 18, 2018, entitled "Adaptive Namespaces for Multipath Redundancy in Cluster Based Computing Systems," by Enz et al, the entire contents of which are incorporated herein in their entirety for all purposes.

TECHNICAL FIELD

This disclosure relates to the field of data storage. More particularly, this disclosure relates to storage networks. Even more specifically, this disclosure relates to embodiments of dynamically reconfigurable high-availability storage clusters for use with multipath Input/Output (I/O).

BACKGROUND

Businesses, governmental organizations and other entities are increasingly using larger and larger volumes of data necessary in their daily operations. This data represents a significant resource for these entities. To store and provide rapid and reliable access to this data, high-availability (HA) storage clusters may be utilized. An HA storage cluster (or just HA cluster) is composed of a group of computer systems (or nodes) coupled via a communication medium, where each of the nodes is coupled to hardware resources, including the storage resources (e.g., drives or storage media) of the cluster. The drives or other storage resources of the cluster are almost always non-volatile memory; commonly flash memory in the form of a solid-state drive (SSD).

The nodes of the cluster may present a set of services or interfaces (or otherwise handle commands or accesses requests) for accessing the drives or other resources of the cluster. The drives may therefore be accessed through the nodes of the clusters to store or otherwise access data on the drives. Such clusters may allow at least one node to completely fail, and the remaining nodes take over the hardware resources to maintain availability of the cluster services.

Multipath I/O may be utilized with storage clusters. Multipath I/O works by detecting multiple paths to a given target namespace (e.g., drive, partition, volume, LUN, group of drives, volumes or partitions, etc.), identified by a globally unique namespace identifier. Multiple paths are detected when multipath software (usually executing on a host or initiator of a storage network) makes a determination that more than one namespace shares the same namespace identifier.

Multiple namespace are then abstracted into a composite multipath device, triggering a path check algorithm that figures out the state of the paths as being "active" or "passive". In the context of HA storage clusters, however, many of the implementation of multipath I/O may be problematic. For example, several of the multipath mechanisms and path checker algorithms, such as differing path priority, Test Unit Ready (TUR) or Asymmetric Logical Unit Access (ALUA) are limited to SCSI or FC based storage appliances, or require explicit hardware plugin support at the initiator.

Thus, it is desirable to provide improved HA storage clusters with multipath capabilities.

SUMMARY

Accordingly, embodiments herein may utilize an adaptive scheme to dynamically reconfigure device namespaces, based on the state of the cluster to support multipath redundancy in storage clusters, including those storage clusters utilizing NVMeoF. It will be noted that as used herein a physical drive may contain one or more namespaces. Each namespace can act like a smaller drive (e.g., like a partition). The namespaces can be used by the same endpoint or different endpoints. However, all namespaces on the same physical drive may be owned by the same Node, as they may share a single PCIe interface.

Embodiments utilizing such an adaptive namespace may provide redundant multipath I/O on HA clusters or other platforms, even in instances where access to storage resources is limited to a single node. These, and other advantages, may be accomplished by advertising drive namespaces, in absence of direct drive access, from one or more of the nodes of the cluster. Furthermore, the embodiments may provide reconfiguration of the namespaces to reflect an updated path state to an initiator path checker in the event of a storage resource, network or storage node failure.

Embodiments may therefore be deployed, for example, in an HA storage appliance cluster utilizing NVMeoF, where access to a storage resource is limited to the active node of the cluster and where a multipath initiator software supports an I/O based path checker algorithm. Other deployments, and uses, of embodiments in other types of storage clusters or storage networks will be understood from the disclosure and are fully contemplated herein.

In one embodiment, a high availability storage cluster, comprises a switch; a set of storage resources coupled to a set of hosts and coupled to the switch via a first network and a set of nodes coupled via a second network to the switch, each node including an HA module thereon. The HA module at a first node may maintain a real storage object representing a corresponding storage resource a ghost storage object corresponding to the real storage object and the storage resource. The real storage object is configured with a namespace identifier for the corresponding storage resource and the real storage object provides an interface for accessing the corresponding storage resource. The ghost object is configured with the same namespace identifier as the corresponding real storage object, provides the interface, and is configured to return an error in response to a call to the interface. In some embodiment, the ghost storage object may be configured to return an error to an I/O call (e.g., read or write calls), while supporting certain other commands such as discovery, connect or namespace identify commands.

The HA module can thus be configured for associating the real storage object with a host when the first node owns the storage resource such that receiving a command from the host comprises calling the interface of the real storage object to execute the command, including returning a valid path in response to a discovery, connect or namespace ID command issued by a multipath module of the host. When the first node does not own the storage resource the ghost storage object is associated with the host such that when the first node does not own the storage resource receiving the command from the host comprises calling the interface of the ghost storage object to return an error to the command issued by the multipath module of the host when the command is an I/O command (typically a read or write command). In particular embodiment, the ghost storage object may support certain commands such as discovery, connect or namespace identify commands such that the ghost storage object returns a valid path when the command issued by the multipath module of the host is a discovery, connect or namespace ID command while retuning an error to an I/O command.

In some embodiments, when the first node does not own the source resource HA module may determine that a second node that owns the storage resource has failed and in response to the determination that the second node has failed may disassociate the ghost object for the storage object from the host and associate the real storage object for the storage resource with the host such that receiving the command from the host comprises calling the interface of the real storage object to execute the command, including returning the valid path in response to the discovery, connect or namespace ID command issued by a multipath module of the host.

In other embodiments, associating the real object with the host comprises attaching the real storage object to an endpoint associated with the host, associating the ghost storage object with the host comprises attaching the ghost storage object to the endpoint associated with the host, and disassociating the ghost object for the storage object from the host comprises detaching the ghost storage object from the endpoint associated with the host.

In certain embodiments, the storage resources are single-ported NVMe drive and the switch is a virtually partitioned switch.

In another embodiment, the HA module may reconfigure the switch to assign the storage resource and the first node to a same virtual switch partition in response to determining that the second node that owns the storage resource has failed.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
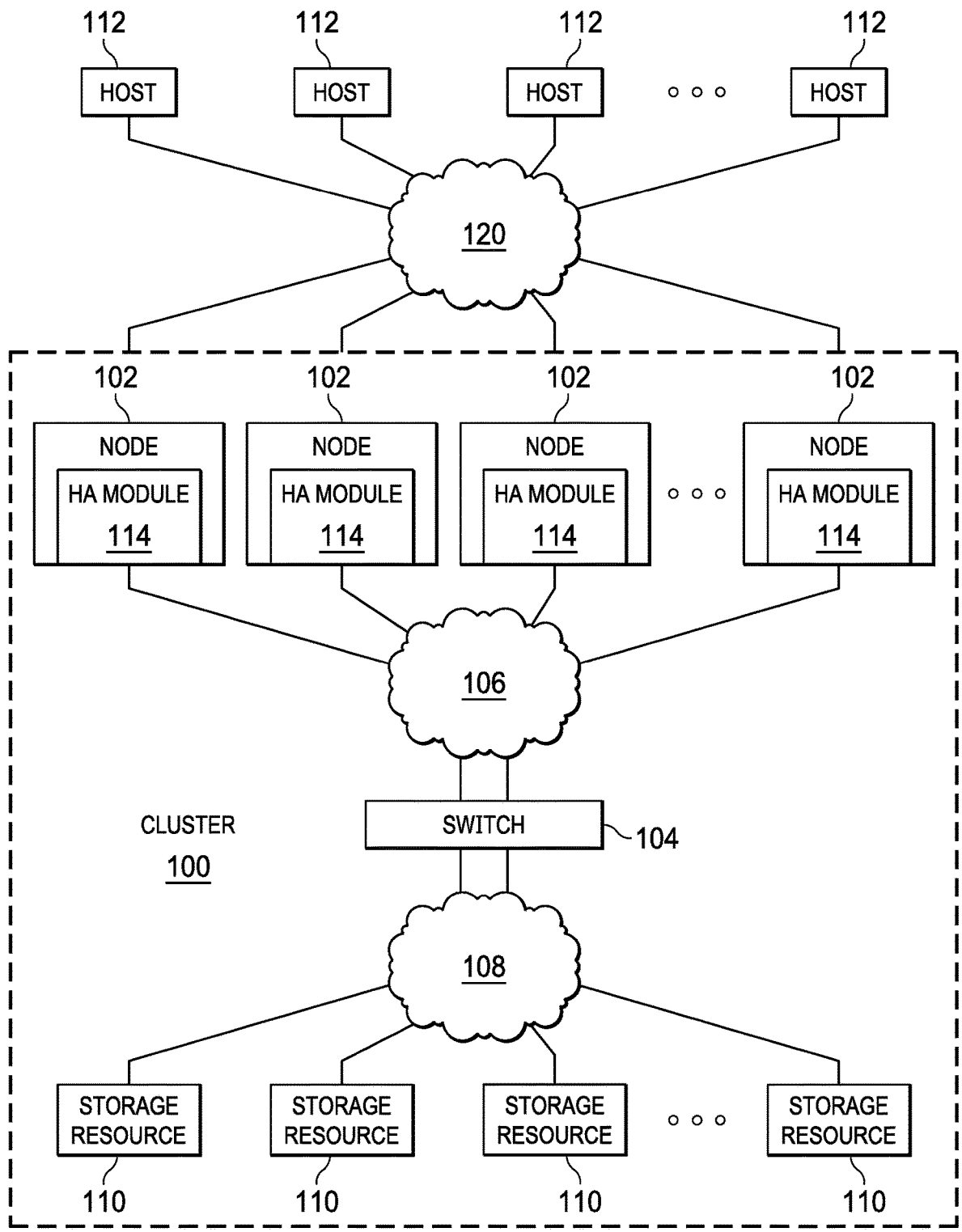
FIG. 1 is a diagrammatic representation of a storage network including one embodiment of a storage cluster.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing specific embodiments, some context may be useful. Businesses, governmental organizations and other entities are increasingly using larger and larger volumes of data necessary in their daily operations. This data represents a significant resource for these entities. To store and provide rapid and reliable access to this data, high-availability (HA) storage clusters may be utilized. An HA storage cluster (or just HA cluster) is composed of a group of computer systems (or nodes) coupled via a communication medium, where each of the nodes is coupled to hardware resources, including the storage resources (e.g., drives or storage media) of the cluster. The drives or other storage resources of the cluster are almost always non-volatile memory; commonly flash memory in the form of a solid-state drive (SSD).

The nodes of the cluster may present a set of services or interfaces (or otherwise handle commands or accesses requests) for accessing the drives or other resources of the cluster. The drives may therefore be accessed through the nodes of the clusters to store or otherwise access data on the drives. Such clusters may allow at least one node to completely fail, and the remaining nodes take over the hardware resources to maintain availability of the cluster services. These types of clusters are usually referred to as HA clusters.

Non-Volatile Memory Express (NVMe or NVME) or Non-Volatile Memory Host Controller Interface Specification (NVMHCIS), an open logical device interface specification for accessing non-volatile storage media, has been designed from the ground up to capitalize on the low latency and internal parallelism of flash-based storage devices. Thus, in many instances, the nodes of a cluster are coupled to the storage resources over a communication medium through a Personal Computer Interface (PCI) Express (PCIe or PCIE) bus or switch and NVMe is used to communicate between the nodes and the storage resources. This communication medium may, for example, be a communication network such as Ethernet, Fibre Channel (FC) or InfiniBand. These types of storage clusters are often referred to as NVMe over Fabrics (NVMeoF or NVMEoF).

For NVMeoF storage appliances, the cluster is responsible for serving data from the drives to network attached client computers. As with other types of storage networks, NVMeoF storage nodes often require clustering for high-availability. Typical solutions have primitive failover capabilities that may only allow a single node in the cluster to fail. Other solutions may require specialized drives with multiple PCIe ports. Moreover, these traditional high-availability solutions for NVMe require multiple PCIe ports in each drive. This increases the cost of the solution and limits the failover to a two node cluster.

Other solutions may utilize a virtually partitioned PCIe switch with single port drives. However, the failure detection and failover mechanisms tend to be very limited hardware processes that only support complete node failure (as opposed to individual resource failover) and a 1+1 or N+1 redundancy model. Those models tend to be insufficient for extremely high levels of reliability, since there is no redundancy for a particular node after a single failure.

More specifically, existing models for highly available NVMeoF servers may fall in two categories. One category requires dual ported NVMe drives that can connect to two separate nodes in the cluster. Either or both nodes may issue input/output (I/O) commands to the drives. During a failover event, one node must assume full control of the drive but this does not require any hardware reconfiguration. However, this model limits the cluster to two nodes since drives only support two ports. Additionally, this model adds cost to the drive to support dual ports.

Another high-availability category uses a single virtually partitioned PCIe switch with two or more root nodes. Each node can utilize a subset of the devices, but a drive is only visible to one node at a time due to the switch partitioning. In this model, a failover requires a reprogramming of the virtual partition of the PCIe switch to move all of the drives on the failed node to an active node. Existing implementations of this model tend to use a few static configurations such as a simple two node cluster with three states (both active, or either node failed). Furthermore, the failover mechanism tends to be a global all-or-nothing event for the entire node, where all drives transition together.

What is desired, therefore, are highly available storage clusters, including NVMeoF storage clusters, with increased sized and higher availability and decreased individual hardware (e.g., drive hardware) requirements.

To those ends, among others, embodiments as disclosed herein may include a storage cluster including a set of nodes that coordinate ownership of storage resources such as drives, groups of drives, volumes allocated from drives, virtualized storage, etc. (referred to herein collectively and interchangeably as storage resources, drives or drive resources without loss of generality) between and across the nodes. Specifically, embodiments may include nodes that coordinate which node in the cluster owns each drive. As the ownership is transferred between nodes in the cluster, the embodiments may dynamically and adaptively (re)configured a switch (e.g., a PCIe switch) or a virtual switch partition to effectively configure the switch such that the drives are in communication with the appropriate nodes. In this manner, the node count in the cluster may be increased, an N-to-N redundancy model for node failures may be achieved along with multi-path cluster communications, and fine-grained failover of individual resources (instead of entire nodes).

Specifically, embodiments may model or implement virtual abstractions of storage resources of a cluster in a quorum based resource management system such that the storage resources may be managed by the quorum based system. The storage resources may, for example, be abstracted or modeled as generalized resources to be managed by the quorum based resource management system.

Modules to implement the underlying hardware configuration needed to accomplish the management tasks (e.g., the reprogramming of a switch to reassign the storage resources) can then be accomplished using these modules. In this manner, the quorum based resource management system may manage storage resources, including hardware, utilizing management rules, while the implementation of the hardware (or software) programming needed to accomplish management tasks may be separated from the quorum based resource management system.

Moving now to FIG. 1, a general architecture for one embodiment of an HA storage cluster is depicted. According to one embodiment the cluster 100 includes a set of nodes 102 coupled to a switch 104 over a communication medium 106. The switch may be a PCIe switch as is known in the art or another type of switch. However, for ease of understanding the switch 104 may be referred to herein as PCIe switch without loss of generality. The set of nodes 102 are also coupled to one another through a communication medium, which may be the same as, or different than, the communication medium 106 or switch 104.

The switch 104 is coupled to a set of storage resources 110 over communication medium 108. These storage resources 110 may be drives (e.g., SSDs), volumes of drives, groups of drives, logical partitions or volumes of drives, or generally any logically separable storage entity. The communication mediums 106, 108 may be the same or different communication mediums and may include, for example, PCIe, Ethernet, InfiniBand, FC, or another type of communication medium.

The switch 104 may be configurable such that storage resources 110 are associated with, or belong to, particular nodes 102. The configurability is sometimes referred to as switch partitioning. In particular, the switch 104 may be configured such that nodes 102 coupled to a particular port of the switch may be in a partition with zero or more storage resources 110. Examples of such switches 104 include PCIe switches such as PES32NT24G2 PCI Express Switch by IDT or the Broadcom PEX8796.

When a storage resource 110 can be accessed through a particular node 102, this may be colloquially referred to as the node 102 "owning" or being "assigned" the storage resource 110 when they are in the same partition. Thus, cluster 100 can serve data from the storage resources 110 to hosts 112 coupled to the cluster 100 through communication medium 120 which again may include, PCIe, Ethernet, InfiniBand, FC, or another type of communication medium. Hosts 112 issue requests to nodes 102 and the nodes 102 implement the requests with respect to the storage resources 110 to access data in the storage resources 110. The request may be routed or directed to the appropriate node 102 of the partition to which a storage resource 110 associated with the request belongs, and the node 102 may implement the request with respect to the storage device 110 or the data thereon.

Each node 102 of the cluster 100 includes an HA module 114. The set of HA modules 114 may coordinate with one another to dynamically coordinate ownership of the storage resources 110 of the cluster 100 by dynamically reprogramming switch 104 based on the state of the cluster, including the nodes 102, storage resources 110 or switch 104 of the cluster 100.

According to embodiments, the HA modules 114 on each node 102 may communicate between the nodes 102 using the same network as the data transfers from the storage devices 110 to the hosts 112, or a different network. For example, the HA modules 114 may communicate in an out of band Ethernet network separate from the data transfers, a data path in band Converged Ethernet network shared with the data transfers, a data path in band Ethernet over Infini-Band network shared with the data transfers or a PCIe point-to-point or multicast messages via the switch 104. Other communication mediums are possible for communication between the HA modules and are fully contemplated herein.

The HA modules 114 may implement a distributed cluster state machine that monitors the state of the cluster 110 and dynamically reprograms switch 104 based on the state of the cluster 100 and the state machine. Each of the HA modules 114 may maintain a state of the cluster 100 where the state is synchronized between the HA modules 114. Moreover, the HA modules 114 may monitor the status of the resources in the cluster 100, including the other nodes 102, the switch 104, the storage resources 110, the communication mediums 106, 108 or other resources. This monitoring may occur by attempting to "touch" or otherwise access the switch 104 or storage resources 110, or utilizing a "heartbeat" message communicated between HA modules 114.

When a failure is detected in a resource in the cluster 100, the HA module 114 may reconfigure the cluster 100 according to the state machine to account for the failure of the resource. For example, if a node 102 failure is detected, the HA module 114 may access the state machine to determine which storage resources 110 are associated with the failed node 102 (e.g., the storage resources 110 in a virtual switch partition associated with the failed node 102) and where (e.g. which nodes 102 or switch partition) to re-assign those storage resources 110. Based on this determination, the HA module 114 may re-program switch 104 to configure the switch 104 to re-assign those storage resources 110 to the appropriate node 102 or switch partition. By dynamically reprogramming the switch 104 to re-assign resources within the cluster, increased node count in the cluster 100 may be achieved, along with an N-to-N redundancy model for node failures, multi-path cluster communication and fine-grained failover of individual resources instead of entire nodes.

In another embodiment, the HA module 114 may reconfigure the cluster 100 according to the state machine to account for other aspects associated with a resource. For example, if bandwidth or data rate associated with a resource falls below a certain threshold level, the HA module 114 may access the sate machine to determine where (e.g. which nodes 102 or switch partition) to re-assign those storage resources 110. Based on this determination, the HA module 114 may re-program switch 104 to configure the switch 104 to re-assign those storage resources 110 to the appropriate node 102 or switch partition to increase the data rate or increase overall performance of the cluster 100.

Figure 2:
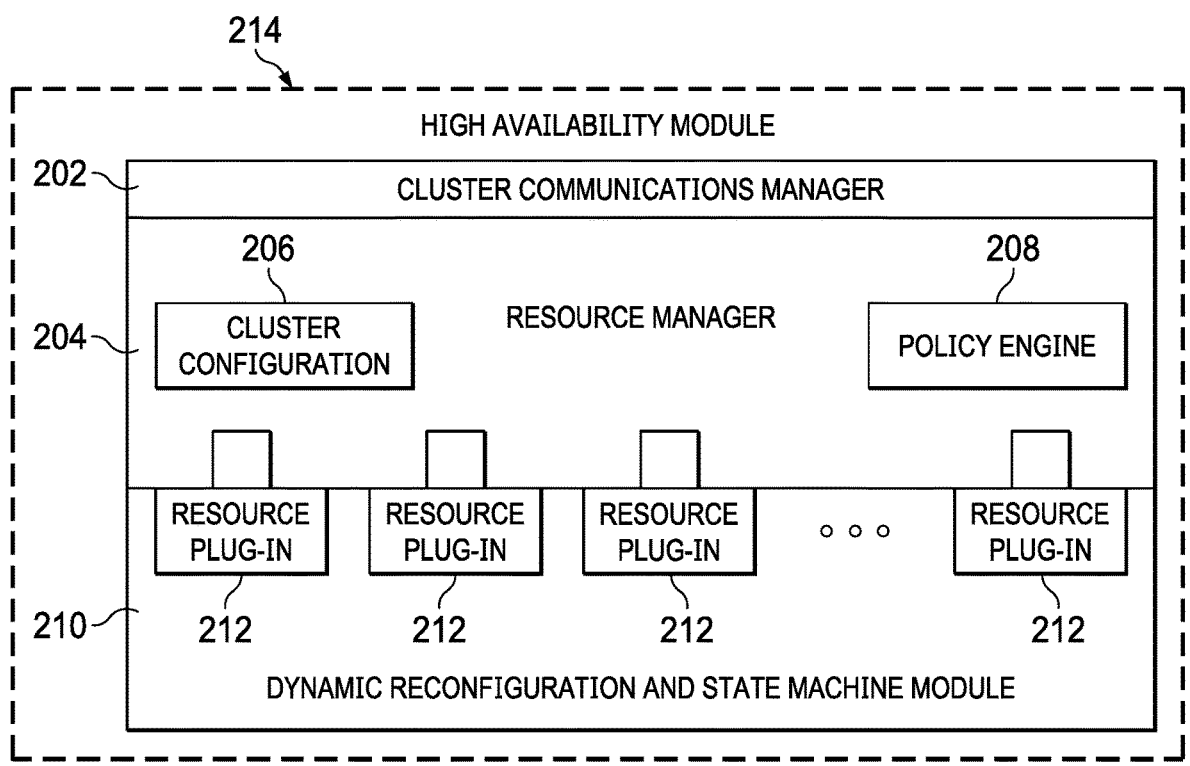
FIG. 2 is a diagrammatic representation of one embodiment of a high-availability (HA) module.

Turning to FIG. 2, one embodiment of an architecture for an HA module for use on nodes of a storage cluster is depicted. The HA module 214 may include a cluster communications manager 202. This cluster communications manager 202 may create a communication framework for the entire cluster to see a consistent set of ordered messages that may be transmitted over multiple different networks. The messages are delivered in the same sequence on each node in the cluster, allowing all nodes to remain consistent on cluster configuration changes.

This layer may also be responsible for maintaining cluster membership, where all nodes are constantly communicating with all other nodes to prove they are still functional. Any failure to receive a heartbeat notification may be detected by any other member of the cluster (e.g., the HA module 214 on another node of the cluster). Upon detection, the remaining nodes use the in-order communication network to mark the failed node offline. One example of a tool that may be utilized to employ a cluster communications manager or portions thereof is Corosync. Another tool that may be utilized is Linux HA-Heartbeat.

HA module 214 may also include a cluster resource manager 204 used to manage abstract resources in a cluster of computers. The resources may represent actual resources (either logical or physical) in the cluster. These resources may be started (or associated with) one or more nodes in the cluster. The resources are substantially constantly (e.g., at an interval) monitored to ensure they are operating correctly, for example, by checking for fatal crashes or deadlocks that prevent normal operation.

If any failure is detected, the resource manager 204 uses a set of rules or priorities to attempt to resolve the problem. This would include options to restart the resource or move it to another node in the cluster. One example of a tool that may be utilized to employ a cluster resource manager 204 or portions thereof is Pacemaker. Other tools that may be utilized by the HA module 214 may include the cluster manager CMAN, the Resource Group Manager (RGManager) and the Open Service Availability Framework (OpenSAF). Other tools are possible and are fully contemplated herein.

The cluster (e.g., an NVMeoF cluster) requires understanding the underlying hardware platform. The information about the available programmable interfaces (such as partitioned PCIe switch models), drive locations (such as slots and PCIe switch port locations), and other behaviors are listed in a platform configuration file. That file is used to create the cluster.

In particular, the resource manager 204 may include a cluster configuration 206 and a policy engine 208. In one embodiment, the configuration 206 may allow the resource manager 204 and HA module 214 to understand the underlying hardware platform. The information about the available programmable interfaces (e.g., such as partitioned PCIe switch models), drive locations (such as slots and PCIe switch port locations), and other resources and behaviors are listed in the cluster configuration 206.

Accordingly, in one embodiment, the cluster configuration 206 may define the set of resources (e.g., logical or physical) of the cluster. This cluster configuration 206 can be synchronized across the HA modules 214 on each node of the cluster by the resource manager 204. The resources of the cluster may be the storage resources that are high-availability resources of the cluster. Here, such resources may be hardware resources or services, including storage resources, or software services. The resources may also include performance resources associated with the bandwidth or data rate of a storage resource, a node, the switch or the cluster generally.

The definition for a resource may include, for example, the name for a resource within the cluster, a class for the resource, a type of resource plug-in or agent to user for the resources and a provider for the resource plug-in. The definition of a resource may also include a priority associated with a resource, the preferred resource location, ordering (defining dependencies), resource fail counts, or other data pertaining to a resource. Thus, the cluster configuration 206 may include rules, expressions, constraints or policies (terms which will be utilized interchangeably herein) associated with each resource. For example, in a cluster, the configuration 206 may include a list of preferred nodes and associated drives. These rules may define a priority node list for every storage resource (e.g., drive) in the cluster.

Thus, the cluster configuration 206 may define storage resources, such as drives, groups of drives, partitions, volumes, logical unit numbers (LUNs), etc., and a state machine for determining, based on a status of the resources of the cluster, to which node these resources should be assigned. This state machine may also, in certain embodiments, include a current status of the cluster maintained by the cluster manager 204. By defining a resource in the resource manager 204 for storage resources, including hardware based storage resources such as drives, groups of drives, switches, etc., these hardware resources may be dynamically managed and re-configured utilizing an architecture that may have traditionally been used to manage deployed software applications.

In one embodiment, the configuration for the cluster includes the following information: Networking; IP address configuration for cluster management; Multicast or unicast communication setup; Global Policies; Resource start failure behavior; Failback Timeouts and Intervals—Minimum time before a failback after a failover event occurred, and the polling interval to determine if a failback may occur; Node Configuration; Network name for each node; Resources—The set of resources to manage, including the resource plug-in script to use; Dependencies—The colocation dependency of resources that must be on the same cluster node; Order—The start/stop order requirements for resources; Preferred Node—The weighted preference for hosting a resource on each node in the cluster; Instance Count—The number of each resource to create—e.g. one resource vs one resource on each node; Monitoring Intervals and Timeout; Failure Behaviors and Thresholds—Number of failures to trigger a restart or a resource move; Resource Specific Configuration and NVMe drive identifiers, such as GUID, PCI Slot number, and PCIe switch port number Policy engine 208 may be adapted to determine, based on the cluster configuration and a current status of the cluster, to what node of the cluster each storage resource should be assigned. In particular, according to certain embodiments the policy engine 208 may determine a next state of the cluster based on the current state and the configuration. In some embodiments, the policy engine 208 may produces a transition graph containing a list of actions and dependencies.

HA module 214 also includes a dynamic reconfiguration and state machine module 210. The HA module 214 may include one or more resource plug-ins 212. Each resource plug-in 212 may correspond to a type of resource defined for the cluster in the cluster configuration 206. For example, resource plug-ins 212 may correspond to single port drives, dual port drives, load balanced single port drives or other types of storage resources.

Specifically, in certain embodiments, a resource plug-in 212 may present a set of interfaces associated with operations for a specific type of resource and implement the functionality of that interface or operations. Specifically, the resources plug-ins may offer the same or similar set of interfaces and serve to implement operations for those interfaces on the corresponding type of interface. By abstracting the implementation of the interface for a particular type of resources, the resource manager 204 is allowed to be agnostic about the type of resources being managed. This plug-in may be, for example, a resource agent that implements at least a start, stop and monitor interface.

Thus, in certain embodiments, a resource plug-in 212 may be responsible for starting, stopping, and monitoring a type of resource. These plug-ins 212 may be utilized and configured for managing the PCIe switch virtual partition programming based on calls received from the resource manager 204. Different variations of resource plug-ins may thus be used to modify the desired behavior of the storage cluster. Below are example resources and the functionality of a corresponding resource plug-in:

Partitioned Drive—This resource is responsible for reprogramming a PCIe switch to effectively move an NVMe drive from one node to another node.

Performance Drive Monitor—This resource monitors both the health and performance of an NVMe drive. It may report a "fake" failure to cause the drive to failover for load balancing of storage traffic across nodes. Alternatively, it may reprogram the resource to node preference to force movement of the resource between cluster nodes.

Network Monitor—This resource monitors the bandwidth on the data path network device (e.g., Infiniband, RoCE, or Ethernet) to determine if the network is saturated. This will cause "fake" failure events to load balance the networking traffic in the cluster.

Volume/LUN Monitor—This resource tracks a volume that is allocated storage capacity spanning one or more physical drives. The volume resource groups together the drives to force colocation on a single node. With single port drives, all volumes will be on the same node. With dual port drives, the volumes may be spread over two nodes.

Figure 5:
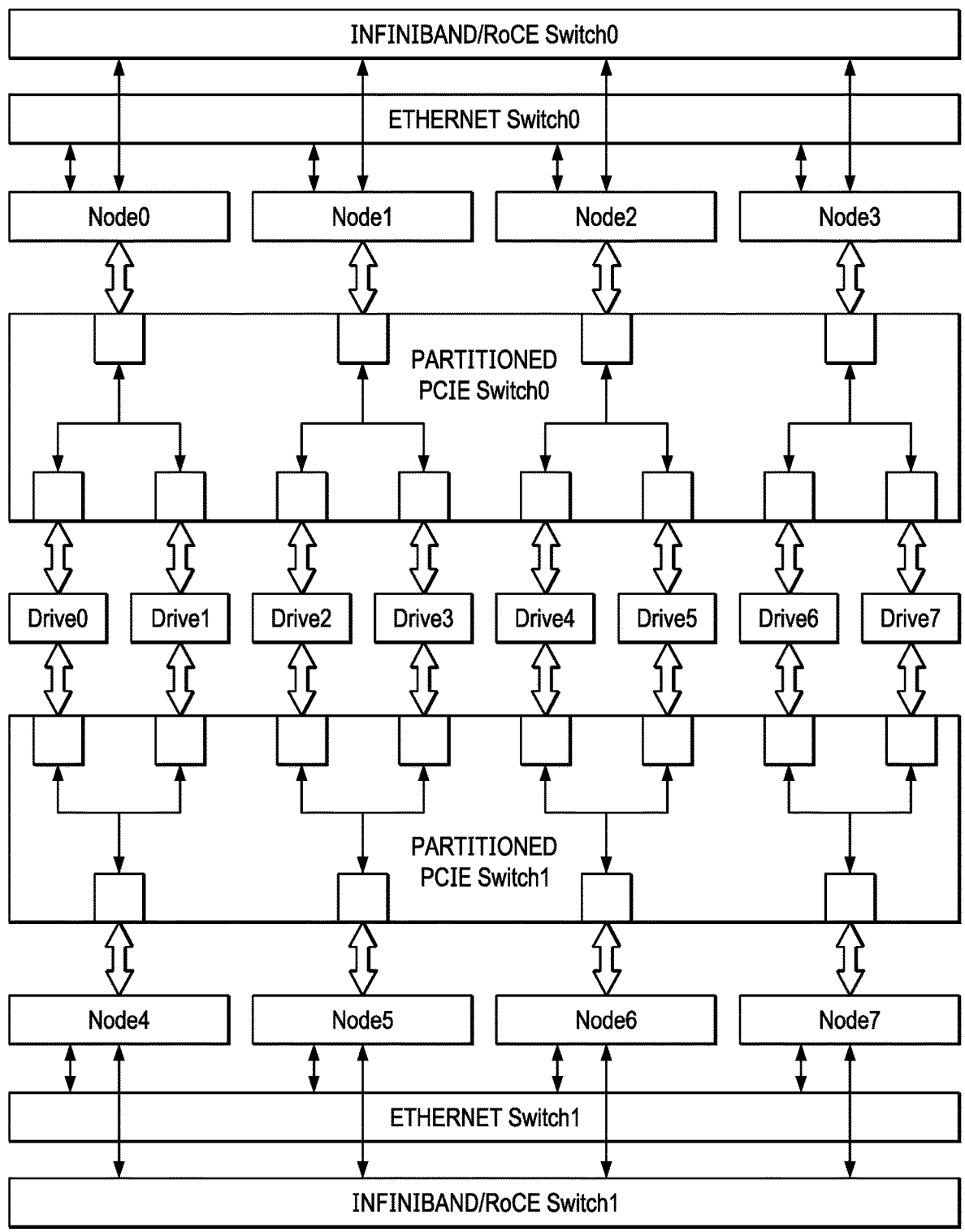
FIG. 5 is a diagrammatic representation of one embodiment of a storage cluster.

Partitioned Drive Port—Similar to the partitioned drive, this resource handles reprogramming one port of a dual port drive (e.g., as shown with respect to FIG. 5). Two of these resources are used to manage the independent ports of a dual ported drive.

Node Power Monitor—This resource will monitor performance for the entire cluster, consolidating resources on fewer nodes during low performance periods. This allows the plug-in to physically power off extra nodes in the cluster to conserve power when the performance isn't required. For example, all but one node may be powered off during idle times.

Network Path Monitor—This resource monitors communication from a node to an NVMeoF Initiator Endpoint that is accessing the data. This network path may fail due to faults outside of the target cluster. Networking faults may be handled by initiating a failure event to move drive ownership to another cluster node with a separate network path to the initiator. This allows fault tolerance in the network switches and initiator network cards.

Storage Software Monitor—The software that bridges NVMeoF to NVMe drives may crash or deadlock. This resource monitors that a healthy software stack is still able to process data.

Cache Monitor—This resource monitors other (e.g., non-NVMe) hardware devices, such as NV-DIMM drives that are used for caching data. These devices may be monitored to predict the reliability of the components, such as the battery or capacitor, and cause the node to shutdown gracefully before a catastrophic error.

Accordingly, the resource manager 204 may monitor the resources (for which it is configured to monitor in the cluster configuration 206) by calling a monitor interface of a corresponding resource plug-in 212 and identifying the resource (e.g., using the resource identifier). This monitor may be called, for example, at a regular interval. The resource plug-in 212 may then attempt to ascertain the status of the identified resource. This determination may include, for example, "touching" or attempting to access the resource (e.g., touching a drive, accessing a volume or LUN, etc.). If the storage resource cannot be accessed, or an error is returned in response to an attempted access, this storage resource may be deemed to be in a failed state. Any failures of those resources may then be reported or returned from the resource plug-ins 212 back to the resource manager 204. As another example, this determination may include, for example, ascertaining a data rate (e.g., data transfer rate, response time, etc.) associated with the storage resource. The data rate of those resources may then be reported or returned from the resource plug-ins 212 back to the resource manager 204.

The current status of the resources of the cluster maintained by the resource manager 204 can then be updated. The policy engine 208 can utilize this current state of the cluster and the cluster configuration to determine which, if any, resource should be reassigned to a different node. Specifically, the policy engine 208 may determine whether the state of the cluster has changed (e.g., if a storage resource has failed) and a next state of the cluster based on the current state and the configuration. If the cluster is to transition to a next state, the policy engine 208 may produce a transition graph containing a list of actions and dependencies.

If these actions entail that a resource be reassigned to a different node, the resource manager 204 may call an interface of the resource plug-in 212 corresponding to the type of resource that needs to be reassigned or moved. The call may identify at least the resource and the node to which the resource should be assigned. This call may, for example, be a start call or a migrate-to or migrate-from call to the resource plug-in 212. The resource plug-in 212 may implement the call from the resource manager 204 by, for example, programming the switch of the cluster to assign the identified storage resource to a virtual switch partition of the switch associated with the identified node.

Figure 3:
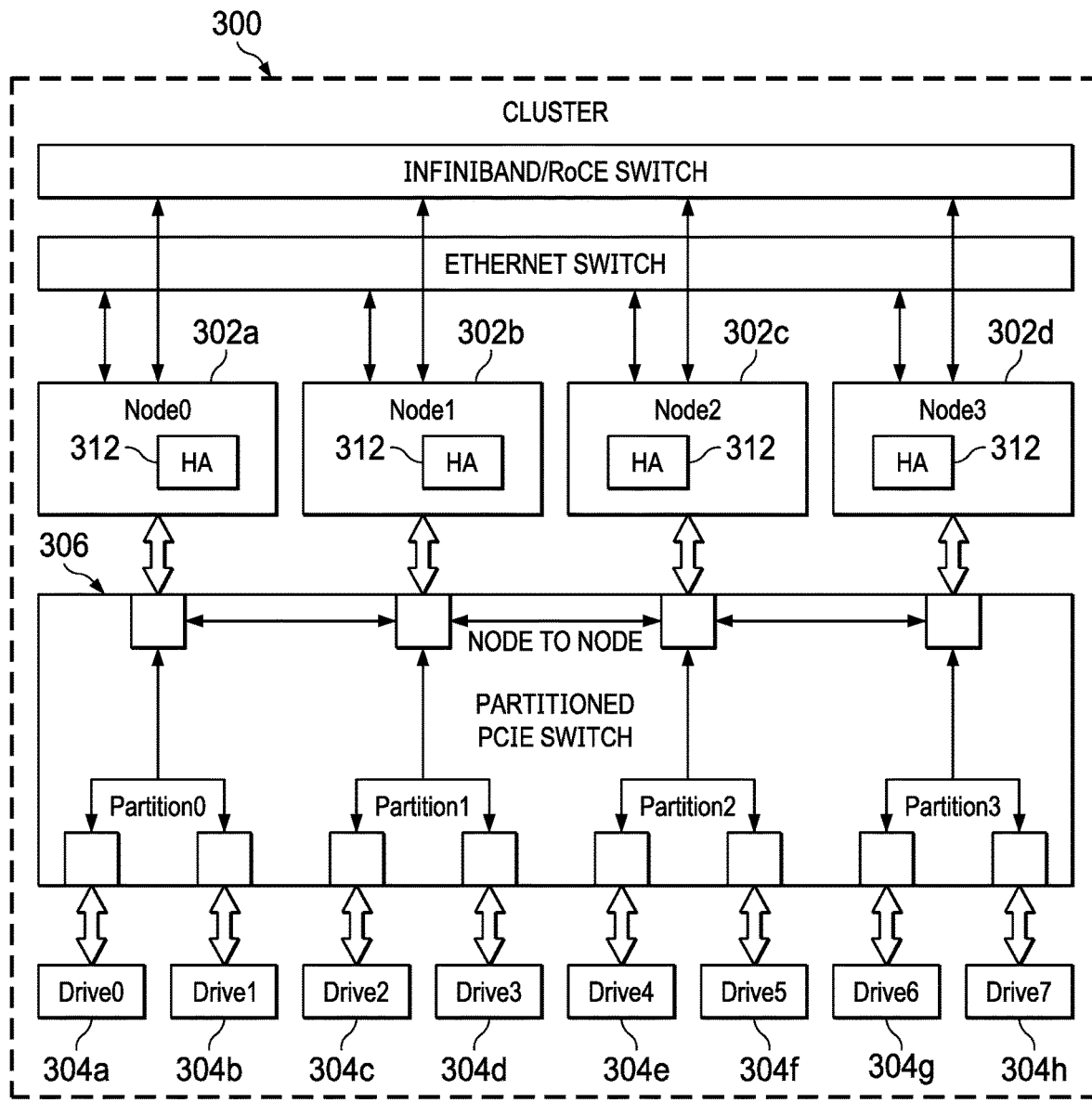
FIG. 3 is a diagrammatic representation of one embodiment of a storage cluster.

It may now be useful to illustrate specific examples of the dynamic reassignment of storage resources and reconfiguration of a cluster by reprogramming of a PCIe switch (and partitions thereon) to increase the availability of storage resources within a cluster. Referring then to FIG. 3, a healthy cluster 300 of four computer nodes 302 with single ported NVMe drives 304 connected to a partitioned PCIe switch 306 is shown. The cluster may communicate on three paths: Ethernet, Infiniband/RoCE, or PCIe Node to Node links. In this example, the PCIe switch 306 is partitioned so Node0 302*a* sees only Drive0 304*a* and Drive1 304*b*, Node1 302*b* sees only Drive2 304*c* and Drive3 304*d*, Node2 302*c* sees only Drive4 304*e* and Drive5 304*f* and Node3 302*d* sees only Drive6 304*g* and Drive7 304*h*.

In particular, the cluster as shown in FIG. 3 is composed of multiple nodes 302 up to the number of virtual switch partitions supported by the PCIe switch 306. This may be, for example from 2 to 16 nodes. The cluster 300 implements an N-to-N redundancy model, where all cluster resources may be redistributed over any remaining active nodes 302. Only a single node 302 is required to be active to manage all the drives 304 on the switch 306, while all other nodes 302 may be offline. This increased redundancy provides resilience to multiple failures and reduces unnecessary hardware node cost for unlikely failure conditions.

The nodes 302 are joined in the cluster 300 using a distributed software state machine maintained by an HA module 312 on the nodes 302 to maintain a global cluster state that is available to all nodes. The cluster state machine in the HA module 312 maintains the cluster node membership and health status. It provides a consistent configuration storage for all nodes 302, providing details of the cluster resources such as NVMe drives. It schedules each drive 304 to be activated on a given node 302 to balance the storage and networking throughput of the cluster 300. It monitors the health of drive resources, software processes, and the hardware node itself. Finally, it handles both failover and failback events for individual resources and entire nodes when failures occur.

The cluster 300 (e.g., the HA modules 312 on each node 302 or other entities in the cluster 300) communicates via unicast or multicast messages over any Ethernet, Infiniband or PCIe (Node to Node) network as shown. The messages may, or may not, use the PCIe switch itself for transmission, which allows multiple, active paths for the nodes 302 (or HA module 312 on each node 302) to communicate. This multi-path cluster topology is a clear advantage over existing models that use only a PCIe non-transparent bridge for communication, since there is no single point of failure in the cluster communication. Even if a node 302 loses access to the PCIe switch 306 and the corresponding drive resources, it may still communicate this failure to the remaining nodes 302 via a network message to quickly initiate a failover event.

By using a software cluster state machine with distributed resource management in HA module 312 on each node 302, much more control over failures may be provided. This state machine (e.g., the configuration and rules defined in the resource manager of the HA module 312, along with a current status of the cluster 300) allows higher node count clusters, maintaining the concept of a cluster quorum to prevent corruption when communication partially fails between nodes. The resource monitoring of the HA modules 312 inspects all software components and hardware resources in the cluster 300, detecting hardware errors, software crashes, and deadlock scenarios that prevent I/O operations from completing. The state machine may control failover operations for individual drives and storage clients for a multitude of reasons, including the reprogramming of switch 306 to assign drives 304 to different partitions associated with different nodes 302. Failure to access the drive hardware may be a primary failover reason. Others may include, but are not limited to, lost network connectivity between the node and remote clients, performance load balancing among nodes, deadlocked I/O operations, and grouping of common resources on a single node for higher level RAID algorithms. This ability to balance resources individually is a key differentiator over existing solutions.

Embodiments of the cluster design described in this disclosure may thus utilize virtually partitioned PCIe switches to effectively move single ported PCIe drives from one node to another. By combining a distributed cluster state machine to control a flexible PCIe switch, the cluster's high-availability is improved while using lower cost hardware components.

It will be noted that embodiments of the same cluster model as described can be extended to use dual port NVMe drives as well, where each port of the drive is attached to a separate partitioned PCIe switch 306 (e.g., as shown in FIG. 3). In these embodiments, the cluster state machine manages each port of the drive as a separate resource, reprogramming the switch on either port for failover events. This effectively creates a separate intelligent cluster for each port of the dual port drive, offering the same benefits discussed earlier, such as high node count with N-to-N redundancy and flexible resource management for failures and load balancing.

It may now be helpful to an understanding of embodiments to discuss the configuration of high availability module 312 of cluster 300. The NVMeoF cluster 300 may require a configuration corresponding to the underlying hardware platform. The information about the available programmable interfaces (such as partitioned PCIe switch models), drive locations (such as slots and PCIe switch port locations), and other behaviors are listed in a platform configuration file.

The following example walks through creating the cluster configuration in FIG. 3. First the cluster configuration file may be loaded in to the HA module 312. This may include identifying which node 302 is currently running and mapping to a node index in the cluster configuration file. The cluster configuration file and node index can be used to identify which PCIe switches 306 exist. Any software modules for programming PCIe switches 306 may be loaded. This may include resource plug-ins or the like for HA module 312. All hardware resources of the cluster may then be assigned to the current node. Newly assigned drives will be "hotplugged" into the cluster and detected by the HA module 312.

The HA module 312 can then detect which NVMe drives are installed, as some PCIe slots may be empty. The next step is to map the PCIe slot and switch port (from the configuration file) to the installed PCI address (from the hardware device scan), to the drive GUID stored (from the storage software stack scan).

At this point, abstract cluster resources to manage the drives may be created based on the above mapping. This entails the creation of the resources in the configuration file of the HA module 312. In particular, the creation of these resources may include creating a drive resource with a type specified in configuration file (such as Partitioned Drive vs Performance Drive Monitor) and the creation of a co-location requirement between the storage software resource and each drive. For example, failure of the storage software of HA module 312 (e.g., on a node), should fail all drives (e.g., on a partition associated with that node).

The creation of cluster resources may also include the creation of an ordering requirement in the configuration file, where the storage software starts before each drive and the creation of a set of preferred node weights in the configuration file for the drives 304. For example, using the illustrated example, the node weights may be: Drive0—N0, N2, N1, N3 [indicating Node 0 is highest preference, so it has the highest weight, while Node3 is the lowest preference]; Drive1—N0, N3, N2, N1; Drive2—N1, N3, N2, N0; Drive3—N1, N0, N3, N2; Drive4—N2, N0, N3, N1; Drive5—N2, N1, N0, N3; Drive6—N3, N1, N0, N2; and Drive7—N3, N2, N1, N0.

The monitoring interval for each drive 304 can then be set in the configuration file (e.g., 10-30 seconds with 30 second timeout). The failover can then be set of the storage resources. For example, a drive resource can be set to failover to another node on the first monitoring failure. The resources in the configuration file can then be configured with all corresponding identifiers (e.g., the drive identifiers: GUID, PCIe Slot, Switch Port). This allows monitoring the resource from the storage stack and HA module 312 and reprogramming the connected PCIe switch 306. Then, networking monitoring resources can be created and defined in the configuration file for the HA module 312.

At this point, node1 302b, node2 302c, and node3 302d can be added to the cluster 300. These nodes 302 will inherit the configuration already done on node0 302a by virtue of the communication between the cluster manager or resource manager of the HA modules 312 on each node 302. Resources of the cluster will automatically be rebalanced by HA module 312 (e.g., by reconfiguration of the switch 306 through resource plug-ins) based on the configured preferred node weights.

Thus, in one embodiment, in a healthy state of operation, the cluster in FIG. 3 performs the following. Each node 302 (e.g., the HA module 312 on each node 302) broadcasts a health check. This indicates if the node 302 is alive and communicating on the cluster. Such a check may not be related to the resource health. The software stack resource (e.g., the HA module 312) monitors for a crash or deadlock by issuing health check commands that use the data path for data in the cluster 300. The HA module 312 uses configured drive resources to monitor the drives 304 by issuing commands to the plug-ins of the HA module 312. The commands will typically access the drive 304 via the PCIe interface of PCIe switch 306 to ensure communication is working. The HA module 312 may utilize any configured performance resources to query the data rates from the storage stack to monitor the performance of the drives 304 or the switch 306. The HA module 312 may use a configured networking resource to detect either local faults (e.g., by using network configuration tools in the OS such as Linux), or failed routes to an initiator by sending network packets (e.g., using ping or arp).

Figure 4:
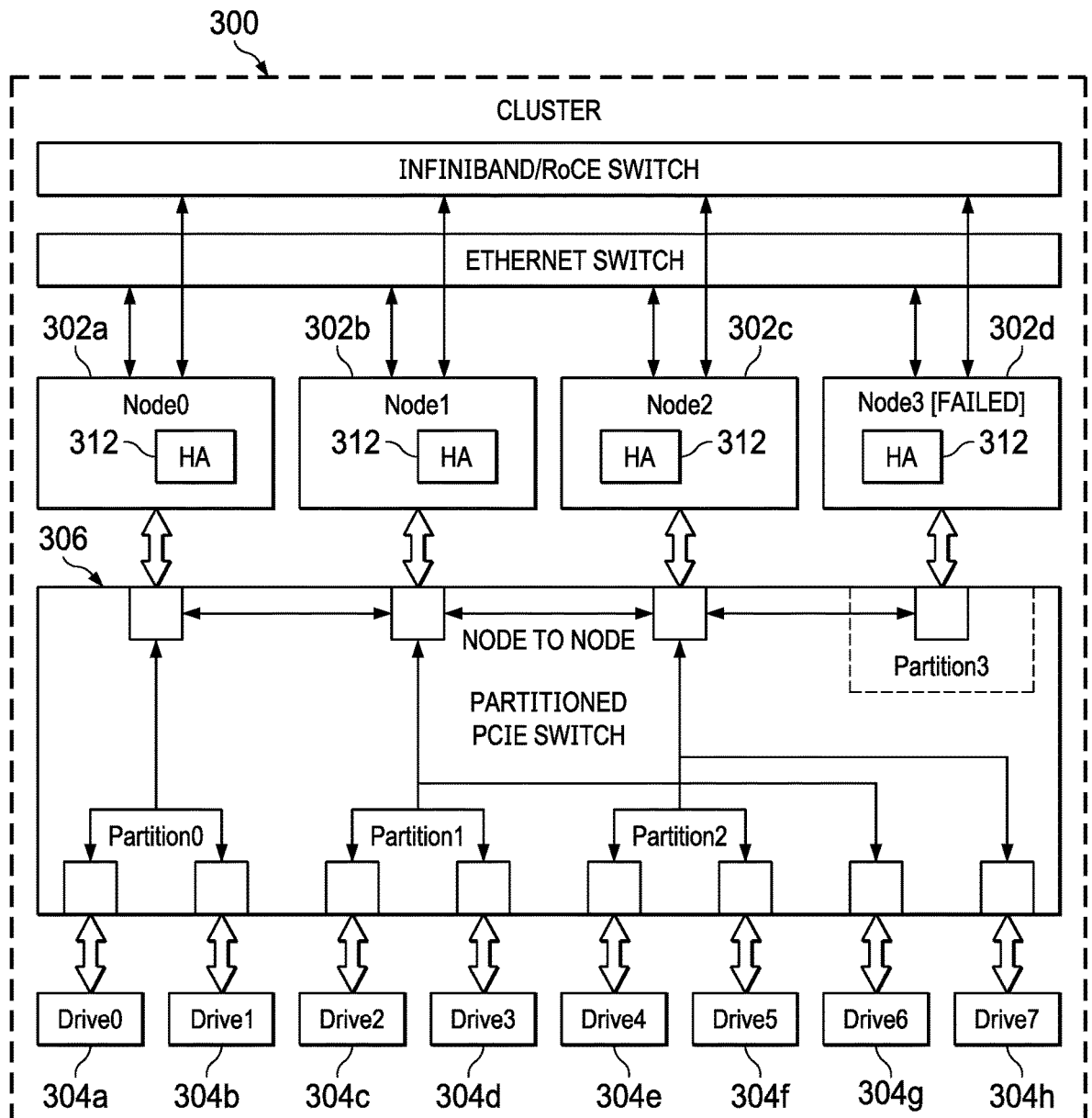
FIG. 4 is a diagrammatic representation of one embodiment of a storage cluster.

Moving now to FIG. 4, a depiction of the cluster 300 of FIG. 3 with one failed node (302d), showing the PCIe Switch 306 reconfigured to attach Drive6 304g to Node1 302b and Drive7 304h to Node2 302c. Here, if a failure is reported for a resource from a monitoring activity (e.g., a monitor call to the resource plug-in for the resource, the HA module 312 will utilize the configuration rules (e.g., the state machine) along with the current status of the cluster 300 to restore the high-availability services.

For example, consider an example where the storage stack fails on Node3 302c as shown in FIG. 4. The following occurs: the storage stack monitor in an HA module 312 on a node 302 reports a failure. Node3 302c cluster software (e.g., the HA module 312) will report it is offline to all nodes 302. Node3 302c will stop all of its resources, including the network monitors, drive resources, and storage stack. These operations may fail, depending on the failure. Each other node 302 (e.g., the HA module 312 on the other nodes 302) will look at the resources that require failover, including Drive6 304g and Drive7 304h.

At this point, Node2 302b (e.g., the HA module 312 on Node302b) will claim ownership of Drive7 304h, since it is the second highest preference as configured in the configuration of HA module 312. By claiming ownership, HA module 312 on Node2 302b will invoke the start operation on Node2 302b (e.g., calling the resource plug-in for the resource configured to represent Drive7 304h in the configuration file of HA module 312). This start call by the HA module 312 on Node2 302b will result in the HA module 312 (e.g., the called resource plug-in) reprogramming the PCIe switch 306 to move Drive7 304h to Node2 302b. Drive7 304h will be detected automatically in the storage stack as a hotplug event and the storage stack will connect Drive7 304h to a remote Initiator connection (if it exists) and Drive7 304h will be immediately available for I/O. In the example illustrated, Node1 302a (e.g., the HA module 312 on Node1 302a) will claim ownership of Drive6 304g with a similar process.

As mentioned, embodiments of the same cluster model as described can be extended to use dual port NVMe drives as well, where each port of the drive is attached to a separate partitioned PCIe switch. In these embodiments, the cluster state machine manages each port of the drive as a separate resource, reprogramming the switch on either port for failover events. This effectively creates a separate intelligent cluster for each port of the dual port drive, offering the same benefits discussed earlier, such as high node count with N-to-N redundancy and flexible resource management for failures and load balancing.

FIG. 5 depicts an example of just such an embodiment. Here, an eight node cluster with dual ported drives that each connect to two PCIe switches is depicted. During normal use both ports may be active, for example, allowing Drive0 to be accessed from Node0 and Node4. Each port can failover to another node on the same PCIe switch. For example, if Node0 fails, Node 1-3 may take over the PCIe port.

Now that embodiments of HA storage clusters have been discussed, it may be useful to delve into more detail regarding how such embodiments may be utilized in various network topologies and with various storage network functionality. More specifically, in storage networks, in order to prevent a single point of failure (SPoF), compute hosts (initiators) may be connected to remote storage appliances or targets via multiple network paths, creating a redundant (active-passive), multipath HA topology. In addition to failover support, multipathing can also be used for load balancing by, for example, spreading I/O across multiple paths. It may thus be desirable to utilize such a redundant HA topology, also termed as active-passive multipath in association with embodiments of HA storage cluster.

To provide a bit more context to aid in an understanding of embodiments as disclosed it may be useful to discuss multipath I/O in a bit more detail. Multipath I/O works by detecting multiple paths to a given target namespace (e.g., drive, partition, volume, LUN, group of drives, volumes or partitions, etc.), identified by a globally unique namespace identifier. Multiple paths are detected when multipath software (usually executing on a host or initiator of a storage network) makes a determination that more than one namespace shares the same namespace identifier.

Multiple namespace are then abstracted into a composite multipath device, triggering a path check algorithm that figures out the state of the paths as being "active" or "passive". Various path checker algorithms (e.g., as enumerated in the Appendix) are used. Using a combination of the configured or detected paths, a path priority and a state of the path or paths (e.g., as queried from device or derived from an I/O status), a path is tagged as active and ready for I/O, or passive and ineligible for I/O. Periodic path checks, or explicit notifications of network link or cluster node failures leads to update of the path states, causing a failover to the redundant (e.g., inactive) path, that is promoted to active from its former passive state. When the failed path recovers, based on the configuration, a failback to the preferred path may be initiated.

In the context of HA storage clusters, however, many of the implementation of multipath I/O may be problematic. For example, several of the multipath mechanisms and path checker algorithms, such as differing path priority, Test Unit Ready (TUR) or Asymmetric Logical Unit Access (ALUA) are limited to SCSI or FC based storage appliances, or require explicit hardware plugin support at the initiator.

NVMeoF storage networks are an emerging trend. A typical HA deployment may utilize dual-ported NVMe SSDs. Multipath support in such a deployment is straightforward. The hardware being accessible from multiple controllers leads to auto-detection of the namespaces from multiple storage controllers. As an example, I/O based determination of the path state, typically accomplished by reading a sector of the namespace is a mechanism that can be used by NVMe based storage appliances. In such instances, HA storage solutions using dual-ported NVMe SSDs rely on the drive being accessible from multiple storage controllers of the storage network. Export of the namespace, accessed from multiple storage controllers of the appliance, occurs "natively", by advertising the namespace via multiple paths in such a deployment.

Implementation of multipath in HA storage clusters that utilize single-ported NVMe storage resources (e.g., drives, volumes, LUNs, etc., accessible through a single port) has, however, proved difficult. HA storage clusters using single-ported NVMe storage resources (e.g., SSDs) are characterized by hardware access to drives being unavailable to the passive nodes in the cluster. Such platforms may rely on platform partitioning schemes such as a virtually partitioned PCIe switch to restrict access of a drive to a specific controller of the appliance as discussed above. In such a deployment, although multiple network paths exist to the multiple storage nodes of the cluster, the device namespace access is restricted to a single node. Multipath support therefore requires some non-native mechanism to advertise the namespace from multiple controllers.

Thus, it is desirable to provide HA storage clusters that may utilize single-ported storage resources (e.g., NVMe storage resources) with the ability to provide a redundant multipath storage solution that can advertise multiple paths to device namespaces on HA storage clusters that circumscribe storage controller access to drives, despite having multiple network paths to the controllers; respond appropriately to path checker algorithms that rely on I/O to determine the path status of multiple paths; and adapt the state of the namespace attached to multiple storage controllers in the event of a network or controller failure.

Accordingly, embodiments herein may utilize an adaptive scheme to dynamically reconfigure device namespaces, based on the state of the cluster to support multipath redundancy in storage clusters, including those storage clusters utilizing NVMeoF. It will be noted that as used herein a physical drive may contain one or more namespaces. Each namespace can act like a smaller drive (e.g., like a partition). The namespaces can be used by the same endpoint or different endpoints. However, all namespaces on the same physical drive may be owned by the same Node, as they may share a single PCIe interface.

Embodiments utilizing such an adaptive namespace may provide redundant multipath I/O on HA clusters or other platforms, even in instances where access to storage resources is limited to a single node. These, and other advantages, may be accomplished by advertising drive namespaces, in absence of direct drive access, from one or more of the nodes of the cluster. Furthermore, the embodiments may provide reconfiguration of the namespaces to reflect an updated path state to an initiator path checker in the event of a storage resource, network or storage node failure.

Embodiments may therefore be deployed, for example, in an HA storage appliance cluster utilizing NVMeoF, where access to a storage resource is limited to the active node of the cluster and where a multipath initiator software supports an I/O based path checker algorithm. Other deployments, and uses, of embodiments in other types of storage clusters or storage networks will be understood from the disclosure and are fully contemplated herein.

For example, in an embodiment of an NVMeoF storage cluster deployment, namespaces attached to a storage endpoint or node, are exported to the initiator as part of a device discovery and connect process, initiated by the host. Adaptive namespace implementation may use multipath management software, running on the initiator, to detect a non-shared resource, such as a single-ported NVMe drive namespace on an active cluster node. A "ghost" counterpart may be created and attached to a storage endpoint on node(s) of the storage cluster that do not have access to the actual storage resource (e.g., drive). The ghost namespace has namespace attributes identical to the real namespace, making it indistinguishable from the real namespace from a discovery and connect process. It is set up to successfully handle any management and administration commands supporting namespace discovery and connect. However, the ghost namespace's I/O path is disabled and returns errors for any I/O destined to it.

Therefore, each path that is probed by the host software, as part of a discovery and connect process, yields real or ghost namespaces. Since the real and ghost namespace share the same namespace identifier, amongst other attributes, a multipath device is created at the host for each set of namespace devices with the same identifier. When the path checker algorithm that reads a sector of a storage resource (e.g., drive) is run, the ghost namespace returns an error, causing the path to be marked as ineligible for I/O at the host. When a controller or network link failure is detected by the appliance multipath management software, a failover is orchestrated.

Figure 6:
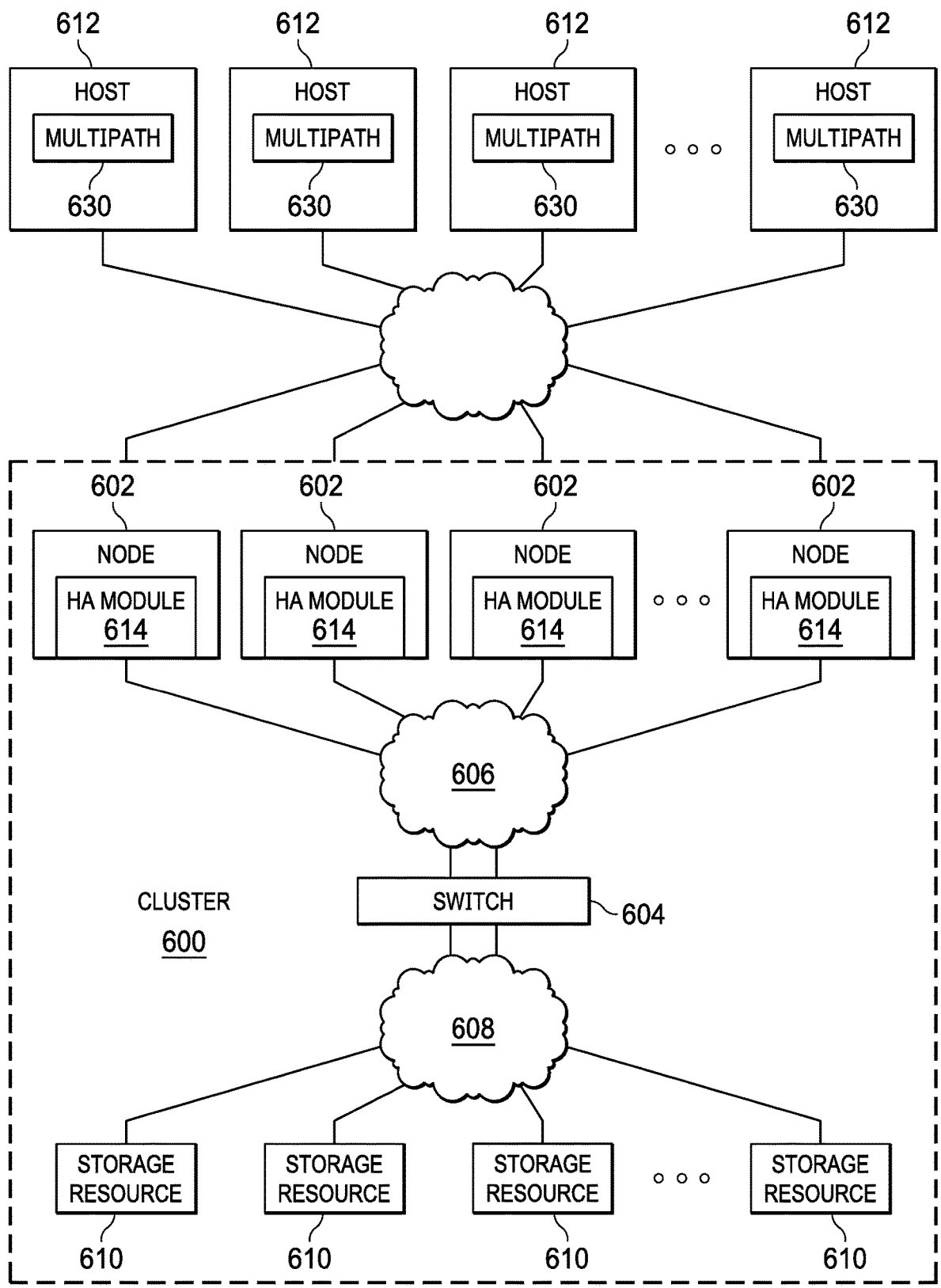
FIG. 6 is a diagrammatic representation of one embodiment of a storage cluster.

Moving now to FIG. 6, a general architecture for one embodiment of an HA storage cluster for use a multipath environment is depicted. According to one embodiment the cluster 600 includes a set of nodes 602 coupled to a switch 604 over a communication medium 606. The switch 604 is coupled to a set of storage resources 610 over communication medium 608. These storage resources 610 may be drives (e.g., SSDs), volumes of drives, groups of drives, logical partitions or volumes of drives, or generally any logically separable storage entity. The switch 604 may be configurable such that storage resources 610 are associated with, or belong to, particular nodes 602. The configurability is sometimes referred to as switch partitioning. In particular, the switch 604 may be configured such that nodes 602 coupled to a particular port of the switch may be in a partition with zero or more storage resources 610. Aspects of the HA storage cluster 600 and hosts 612 are similar to those discussed above with respect to FIG. 1 and will not be elaborated on further here.

Hosts 612 issue requests to nodes 602, the nodes 602 implement the requests with respect to the storage resources 610 to access data in the storage resources 610. The request may be routed or directed to the appropriate node 602 of the partition to which a storage resource 610 associated with the request belongs, and the node 602 may implement the request with respect to the storage device 610 or the data thereon.

Each node 602 of the cluster 600 includes an HA module 614. The set of HA modules 614 may coordinate with one another to dynamically coordinate ownership of the storage resources 610 of the cluster 600 by dynamically reprogramming switch 604 based on the state of the cluster, including the nodes 602, storage resources 610 or switch 604 of the cluster 600.

In this embodiment, each HA module 614 may maintain a set of software object representing each of the hosts 612 and each of the storage resources 610. The software objects for the hosts may include a set of endpoints or virtual storage controllers (referred to without loss of generality as endpoints). These endpoints may be associated with one or more storage resource 610 or a port or partition of switch 604. The software objects representing the storage resources 610 may include storage resource objects representing each storage resource. Each storage resource object may be configured with a namespace identifier (e.g., a globally unique identifier) for the corresponding storage resource 614 and be configured to implement commands (e.g., storage requests) for that storage resource. Thus, when a node 602 owns a particular storage resource 610 the storage resource object for that storage resource 610 may be "attached" or associated with endpoints of the hosts 612.

In one embodiment then, when the HA module 614 on a node 602 receives a command for a storage resource 614 (e.g., a storage resource 614 which that node 612 owns), the data path for implementing the command may include the endpoint object for the host 612 that issued the command and the software object for the requested storage resource 614. The HA module 614 on the node 602 may thus utilize an interface provided by, or otherwise make a call to, the storage resource object corresponding to the storage resource 614 to implement the command. The storage resource object then handles the calls or other interactions with the storage resource 614 to implement the request received at the interface.

Each of the hosts includes a multipath module 630 as is known in the art. Such a multipath module 630 may be, for example, be part of multipath initiator software such as Device Mapper (DM) multipathing for Linux. The multipath module 630 may include a path checker algorithm, such as an I/O based path checker algorithm as is known in the art. The multipath module 630 can thus initiate discovery, connect and path checker processes as are known in the art.

As noted above, there may be multiple paths through nodes 602 and switch 604 to storage resource 610. Because of the partitioning of switch 604, however, there may only a single active path to the storage resource 610, as the storage resource may be a single-ported storage resource. In order to deal with a multipath environment, however, it may be desirable to inform multipath module 630 of the existence of the differing paths to the storage resources 610 in the cluster 600 and respond to request from path checker algorithms of the multipath module 630. Additionally, because HA modules 614 may implement a distributed cluster state machine that monitors the state of the cluster 600 and dynamically reprograms switch 604 based on the state of the cluster 600 and the state machine, it may be desirable to adapt the state of namespaces attached to multiple nodes 602 in the event of a network or storage controller failure (or another type of failure).

In order to accomplish these goals, among others, the HA modules 614 may maintain ghost software objects for each of the storage resources 610. These ghost software objects representing the storage resources 610, may include storage resource objects representing each storage resource where each ghost storage resource object may be configured with the namespace identifier (e.g., the globally unique identifier) for the corresponding storage resource 610 and provide the same set of interfaces as the "real" storage resource object.

However, the ghost storage resource object may be configured to return an error in response to calls to those interfaces.

When a node 602 does not own a particular storage resource 610, the ghost storage resource object for that storage resource 610 may be attached or associated with endpoints of the hosts 612. In this manner, the data path for that storage resource 610 on nodes 602 that do not own that storage resource 610 may include the endpoints and the ghost storage object. Thus, any command (e.g., request) for that storage resource 610 received at that node may be routed through the data path including the ghost software object for the storage resource 610 and may return an error.

Accordingly, when multipath module 630 initiates a discovery, connect or namespace ID process for cluster 600, the nodes 602 will each respond with the globally unique identifier for a storage resource 610. The multiple paths through each of the nodes 602 to the storage resource 610 can thus be identified by the multipath module 630. However, when the multipath module 630 then performs a path check for each of those identified paths (e.g., by reading a sector of the storage resource 610) only the node 602 with the "real" software object for that storage resource 610 attached to the endpoint for that host 612 (e.g., on the node 602 that owns that storage resource 610) will return a valid response. The other nodes 602 (e.g., that do not own that storage resource 610) will issue the command using the ghost storage object for that storage resource 610 attached to the endpoint for that host 612 on that node 602. This will result in an error returned from the ghost storage object and, in turn, an error returned to the issuing multipath module 630. In this manner, the multipath module 630 can identify the multiple paths to the storage resource 610 and identify which of the paths is active (e.g., the path provided through node 602 that owns the storage resource 610) or inactive (e.g., the paths provided through the nodes 602 that do not own the storage resource 610).

Moreover, when a failure is detected in a resource in the cluster 600, the HA module 614 may reconfigure the cluster 600 according to the state machine to account for the failure of the resource. For example, if a node 602 failure is detected, the HA module 614 may access a state machine to determine which storage resources 610 are associated with the failed node 602 (e.g., the storage resources 610 in a virtual switch partition associated with the failed node 602) and where (e.g. which nodes 602 or switch partition) to re-assign those storage resources 610. Based on this determination, the HA module 614 may re-program switch 604 to configure the switch 604 to re-assign those storage resources 610 to the appropriate node 602 or switch partition.

Additionally, as part of this reassigning of the storage resource 610 to another node 602, the HA module 614 on the node 602 which now owns that storage resource 610 may detach the ghost storage object from the endpoints associated with that storage resource 610 and attach the real storage object for that storage resource 610 to those endpoints. In this manner, when the host 612 issues a command on the previously active path for that storage resource 610 it will get an error (e.g., because the node 602 that previously owned that resources and was part of the active path has failed). The host 612 or multipath module 630 thereon will then discover the newly active path (e.g., through the nodes 602 that now own that storage resource 610 and have the real storage object attached to the endpoint associated with that host) and utilize that newly active path to issue any requests or commands to that storage resource.

Figure 7:
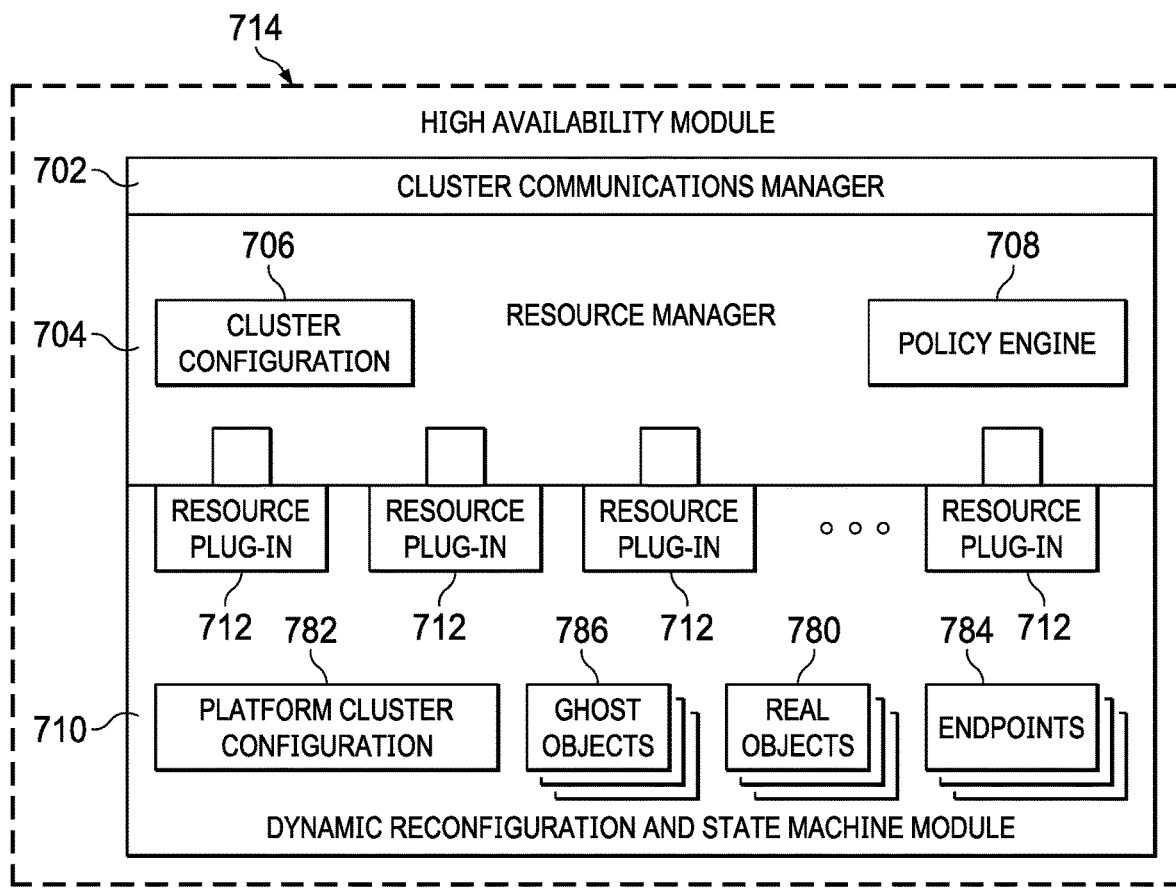
FIG. 7 is a diagrammatic representation of one embodiment of an HA module.

Turning to FIG. 7, one embodiment of an architecture for an HA module for use on nodes of a storage cluster is depicted. The HA module 714 may include a cluster communications manager 702 and cluster resource manager 704 used to manage abstract resources in a cluster of computers.

The cluster (e.g., an NVMeoF cluster) requires understanding the underlying hardware platform. The information about the available programmable interfaces (such as partitioned PCIe switch models), drive locations (such as slots and PCIe switch port locations), and other behaviors are listed in a platform configuration file. That file is used to create the cluster.

In particular, the resource manager 704 may include a cluster configuration 706 and a policy engine 708. In one embodiment, the configuration 706 may allow the resource manager 704 to understand the underlying hardware platform. The information about the available programmable interfaces (e.g., such as partitioned PCIe switch models), drive locations (such as slots and PCIe switch port locations), and other resources and behaviors are listed in the cluster configuration 706.

HA module 714 also includes a dynamic reconfiguration and state machine module 710. The HA module 714 may include one or more resource plug-ins 712. Each resource plug-in 712 may correspond to a type of resource defined for the cluster in the cluster configuration 706. For example, resource plug-ins 712 may correspond to single port drives, dual port drives, load balanced single port drives or other types of storage resources.

HA module 714 may also include platform configuration 782. This platform configuration 782 may include a definition of the cluster, its resources or the attached hosts. This platform configuration 782 may be used by dynamic reconfiguration and state machine module 710 to create, modify or configure cluster configuration 706 of resource manager 704.

Based on the definitions in the platform configuration file 782, the dynamic reconfiguration and state machine module 710 may instantiate or otherwise create endpoints 784 for each of the identified hosts (e.g., in the platform configuration file 782). Additionally, for certain resources identified in the platform configuration file 782, the dynamic reconfiguration and state machine module 710 may create real software objects 780. Moreover, for particular resources identified in the platform configuration file 782, the dynamic reconfiguration and state machine module 710 may also create ghost software objects 786. For example, the dynamic reconfiguration and state machine module 710 may create ghost software objects 786 for each resource identified as a single-ported drive (e.g., a single-ported NVMe drive) in the platform configuration file 782.

Accordingly, in one embodiment, the cluster configuration 706 may define the set of resources (e.g., logical or physical) of the cluster. The resources of the cluster may be the storage resources that are high-availability resources of the cluster. Here, such resources may be hardware resources or services, including storage resources, or software services. The resources may also include performance resources associated with the bandwidth or data rate of a storage resource, a node, the switch or the cluster generally. Thus, the cluster configuration 706 may include rules, expressions, constraints or policies (terms which will be utilized interchangeably herein) associated with each resource. For example, in a cluster, the configuration 206 may include a list of preferred nodes and associated drives. These rules may define a priority node list for every storage resource (e.g., drive) in the cluster.

The HA module 714 may include one or more resource plug-ins 712. Each resource plug-in 712 may correspond to a type of resource defined for the cluster in the cluster configuration 706 or the platform configuration 782. For example, resource plug-ins 712 may correspond to single port drives, dual port drives, load balanced single port drives or other types of storage resources.

Specifically, in certain embodiments, a resource plug-in 712 may present a set of interfaces associated with operations for a specific type of resource and implement the functionality of that interface or operations. Specifically, the resources plug-ins may offer the same or similar, set of interfaces and serve to implement operations for those interfaces on the corresponding type of interface. By abstracting the implementation of the interface for a particular type of resources, the resource manager 704 is allowed to be agnostic about the type of resources being managed. This plug-in may be, for example, a resource agent that implements at least a start, stop and monitor interface.

Thus, in certain embodiments, a resource plug-in 712 may be responsible for starting, stopping, and monitoring a type of resource. These plug-ins 712 may be utilized and configured for managing the PCIe switch virtual partition programming based on calls received from the resource manager 704. These plug-ins 712 may also be utilized to attach or detach real or ghost software objects for storage resource when they are started or stopped on the node.

In particular, plug-ins 712 corresponding to certain storage resources (e.g., single-ported NVMe drives) may be configured to attach a ghost storage object 786 associated with the corresponding storage resource to endpoints on the node when that storage resource is stopped at that node, and attach the real storage object 780 associated with that storage node to the endpoints on the node when that storage resource is started at that node.

Accordingly, the resource manager 704 may monitor the resources (for which it is configured to monitor in the cluster configuration 706) by calling a monitor interface of a corresponding resource plug-in 712 and identifying the resource (e.g., using the resource identifier). This monitor may be called, for example, at a regular interval. The resource plug-in 712 may then attempt to ascertain the status of the identified resource. Any failures of those resources may then be reported or returned from the resource plug-ins 712 back to the resource manager 704.

The current status of the resources of the cluster maintained by the resource manager 704 can then be updated. The policy engine 708 can utilize this current state of the cluster and the cluster configuration to determine which, if any, resource should be reassigned to a different node. Specifically, the policy engine 708 may determine whether the state of the cluster has changed (e.g., if a storage resource or node has failed) and a next state of the cluster based on the current state and the configuration. If the cluster is to transition to a next state, the policy engine 708 may produce a transition graph containing a list of actions and dependencies.

Figure 8:
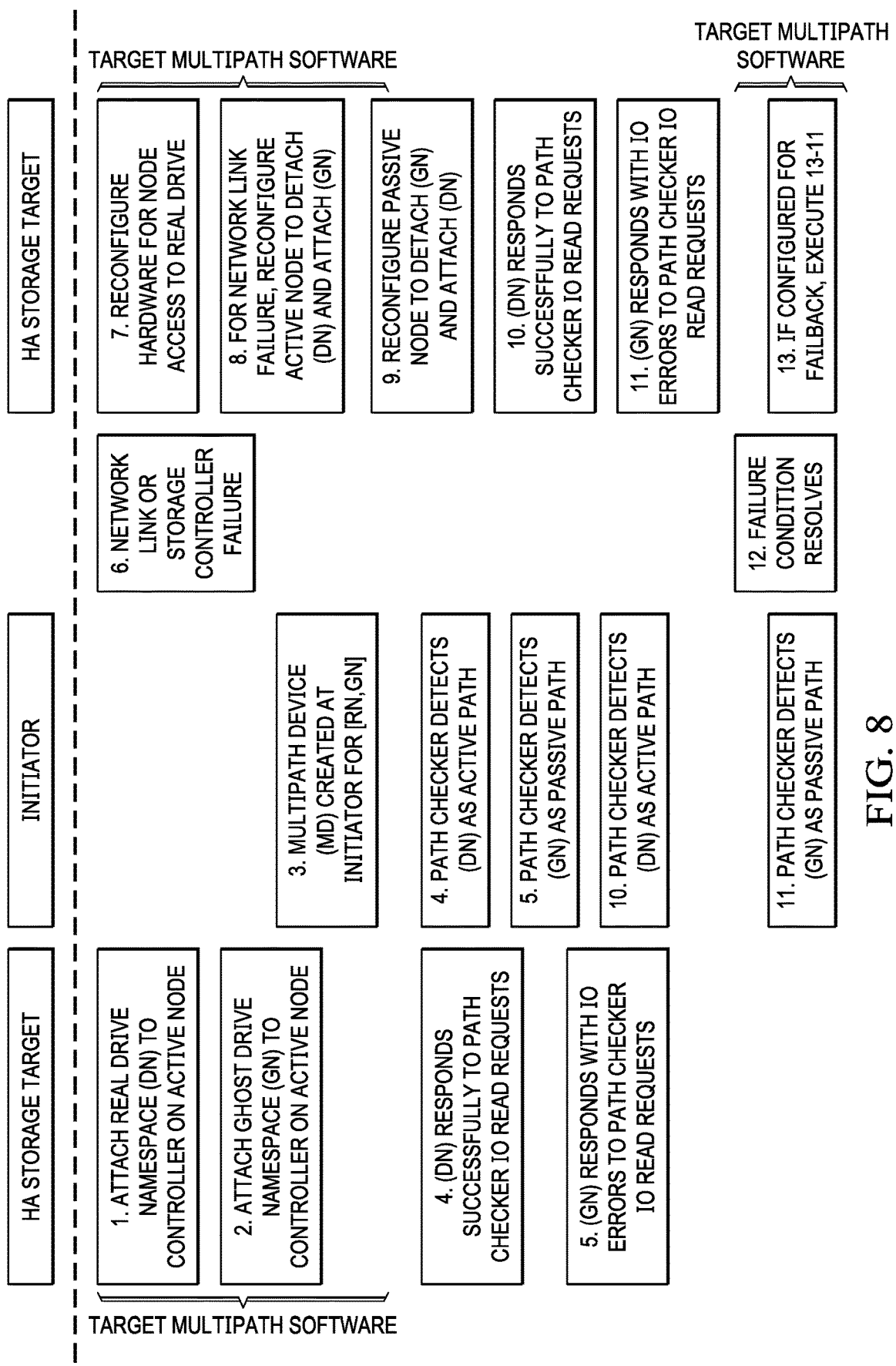
FIG. 8 is a flow diagram for one embodiment of a method for implementing multipath functionality in a storage cluster.

If these actions entail that a resource be reassigned to a different node, the resource manager 704 may call an interface of the resource plug-in 712 corresponding to the type of resource that needs to be reassigned or moved. The call may identify at least the resource and the node to which the resource should be assigned. This call may, for example, be a start call or a migrate-to or migrate-from call to the resource plug-in 712. The resource plug-in 712 may implement the call from the resource manager 704 by, for example, programming the switch of the cluster to assign the identified storage resource to a virtual switch partition of the switch associated with the identified node. Moreover, any ghost storage object 786 for the storage resource may be detached from the endpoints on the node and the real storage resource object 780 associated with that storage resource may be attached to the endpoints 784 on that node by the resource plug-in 712 when the storage resource is started on the node. Similarly, the real storage resource object 780 associated with that storage resource may be detached from the endpoints 784 on that node and the ghost storage object 786 from the storage resource attached to the endpoints by the resource plug-in 712 when the storage resource is stopped on the node FIG. 8 depicts one embodiment of a method for adaptive namespaces in an HA storage cluster. When a node or network link failure is detected in the storage cluster, a failover is orchestrated. Initially, the virtually partitioned (e.g., PCIe) switch is configured to enable drive access to the newly active node. If the active storage controller is accessible, it is reconfigured to yield a failed path. Reconfiguration involves detaching the real drive namespace (e.g., detaching the real storage object for the drive to the endpoints on the node) and attaching a ghost namespace (e.g., attaching the ghost storage object for the drive to the endpoints on the node). This may be done in certain embodiments, only in the event of a network link failure.

The assigned node with a ghost namespace is reconfigured. Reconfiguration involves detaching the ghost namespace and attaching the real drive namespace (e.g., detaching the ghost storage object for the drive from the endpoints on the node and attaching the real storage object for the drive to the endpoints on the node). At this point, the path checker algorithm of the multipath module on the host (for example, either during its poll cycle or via explicit notification) detects the change of state of multiple paths. The formerly disabled path is promoted to an active state. The failed path is demoted to a faulty state until such time that the failure condition is resolved.

On recovery of a node failure condition, the recovered node may be reconfigured by detaching the real drive namespace and attaching a ghost namespace, thus demoting it to a disabled path (e.g., detaching the real storage object for the drive from the endpoints on the node and attaching the ghost storage object for the drive to the endpoints on the node). If a failback option is configured to revert the system to the previous or a preferred path, a failover of the path may be initiated triggering the sequence above to restore the system to the preferred path option.

Figure 9:
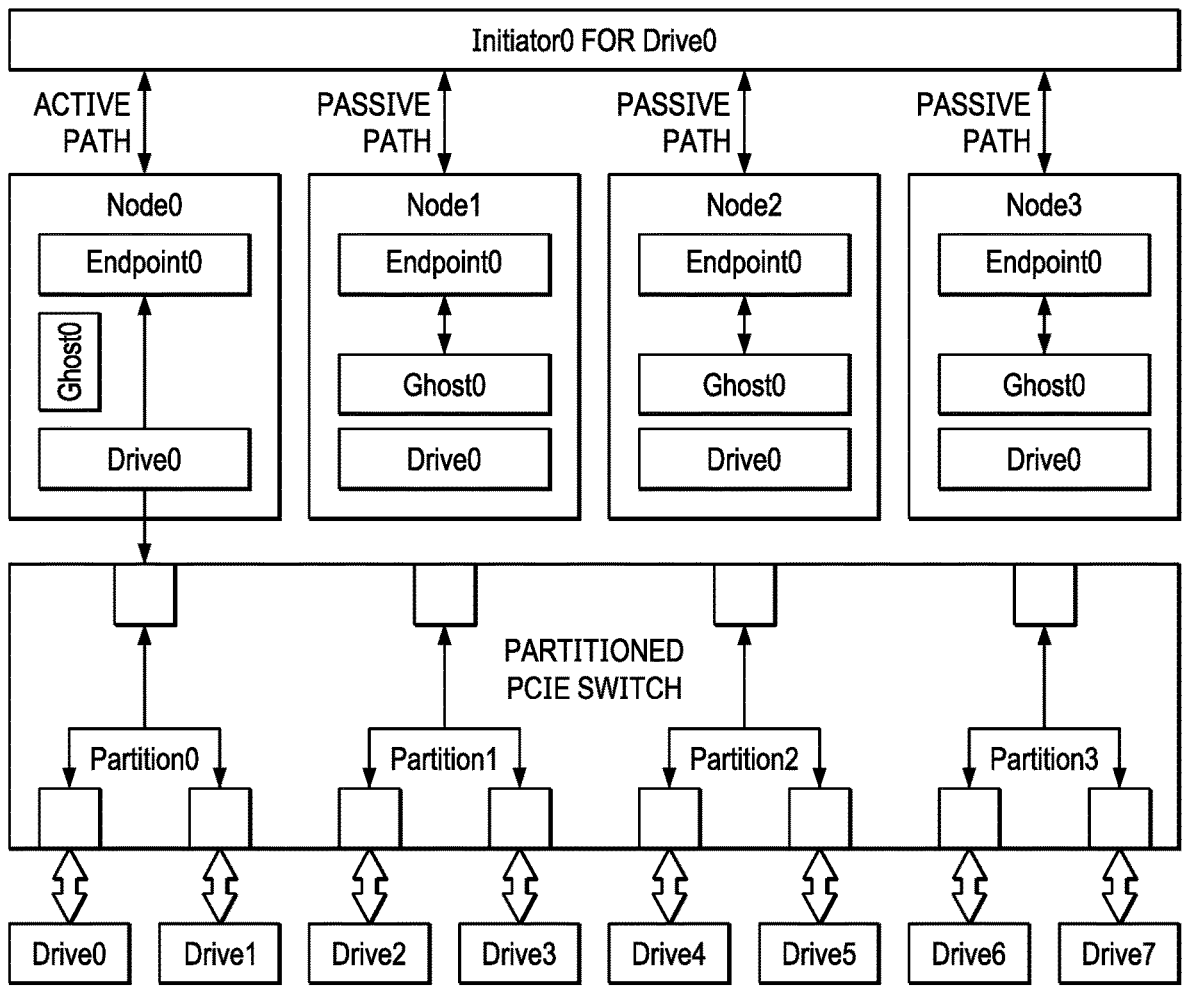
FIG. 9 is a diagrammatic representation of one embodiment of a storage cluster.

It may now be useful to illustrate specific examples of the dynamic reassignment of storage resources in a multipath environment. Referring then to FIG. 9, an embodiment shows an example of a four node storage cluster. This cluster has eight drives that are exported to initiators; however, for purposes of illustration, the figure only shows the full connections for a single initiator0 and drive0. In this example, the storage cluster recognizes an HA system exists, but due to the partitioned PCIe switch, only one node may access each drive at any given time.

During the initial setup of the storage cluster, it will create four ghost drive software abstractions (e.g., ghost software objects) to represent physical Drive0, one per node. Again, these ghost software objects will mimic the real software object for the drive with the same common globally unique identifier.

To expose storage to an initiator, an endpoint can be created on each node. The endpoint allows the administrator to connect one or more drives to a given initiator. In this example, four endpoints are created for Initiator0 and the administrator attaches Drive0 to each. The software cluster may abstract the idea of ghost drives such that an administrator does not see them during configuration. Instead, an administrator only sees physical drives which may be attached to all 4=four endpoints. The internal storage cluster software correctly on each node chooses either the real drive namespace (e.g., real storage object for the drive) or ghost drive namespace (e.g., ghost storage object for the drive) for the endpoint connection.

The result of the configuration creates endpoint to drive mappings as shown in FIG. 9. Since Node0 has direct access to the physical drive0 through the real drive object (Drive0), its endpoint connects to the real drive namespace. Nodes 1-3 all connect the endpoint to the ghost drive namespace through the ghost drive object (Ghost0).

Next, Initiator0 may be discovered and connected to Drive0 on all four storage nodes. Again, all four nodes return the same Drive0 information when a discovery request arrives. They effectively inform the Initiator0 that four paths exist to the same physical drive. Once connected, the Initiator's multipath aware software (e.g. the multipath module on Initiator0 recognizes the parallel paths to the same drive and creates a single Drive0 interface. The multipath software next detects which paths are active by reading a sector on the drive. Node0 will successfully return the read data, while Nodes 1-3 will return an error from the ghost drive (e.g., by issuing I/O calls through ghost storage object Ghost0 an error is returned and this error returned to Initiator0. This informs Initiator0 that the only active path to Drive0 is via Node0. All I/O requests will now use that single active path (e.g., through Node0).

Figure 10:
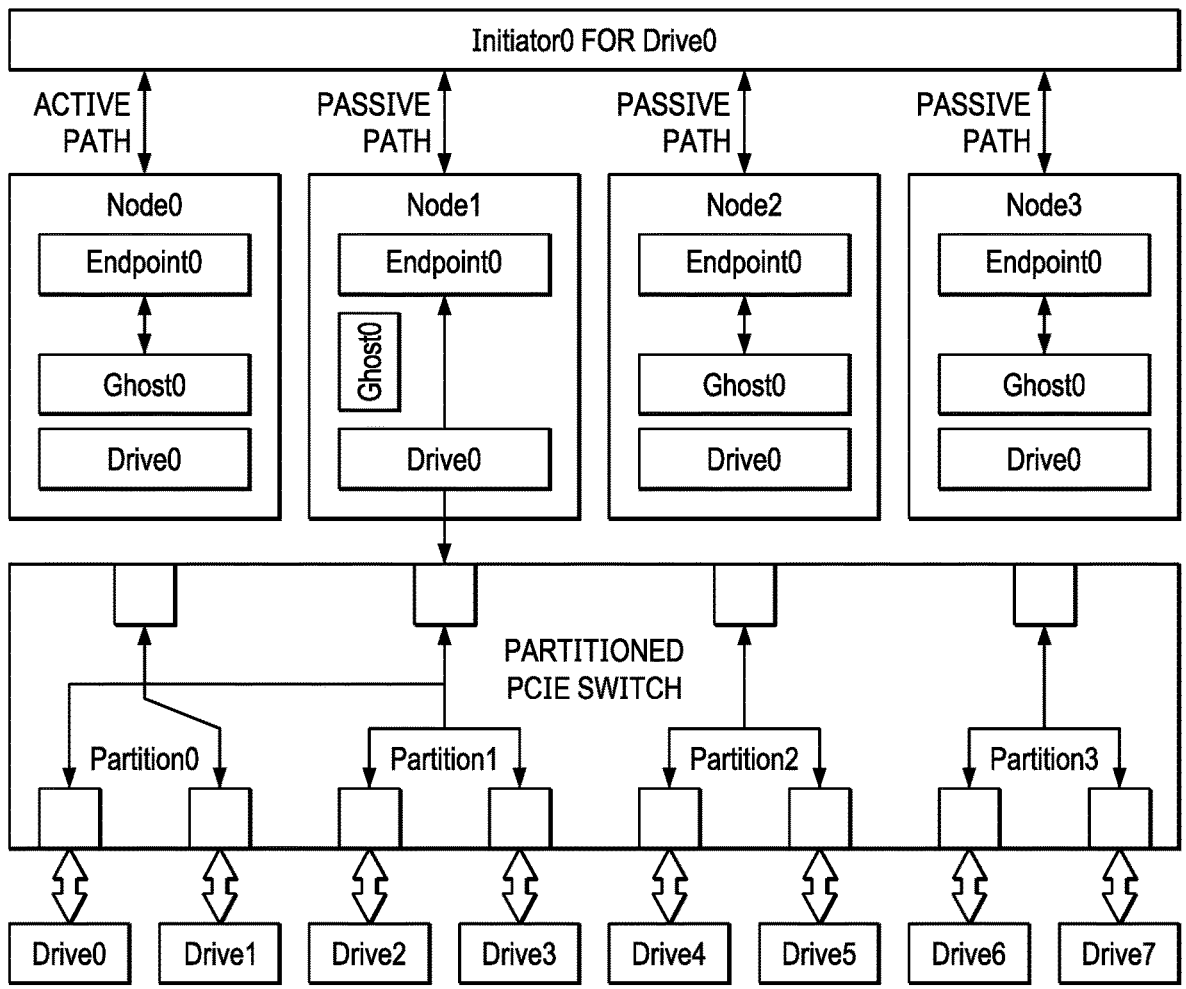
FIG. 10 is a diagrammatic representation of one embodiment of a storage cluster.

Moving now to FIG. 10, example connections after a failover of Drive0 from Node0 to Node1 are shown. Drives are monitored by software modules, called resource agents, that inspect both the accessibility and performance of a drive as discussed. The agent may cause a failover to occur, where the physical drive ownership is moved to another node in the cluster as discussed above.

During the failover event depicted in FIG. 10, Drive0 is reassigned to Node1. First, the resource agent reports a problem with Drive0 on Node0, so the cluster software will immediately connect Node0's endpoint to Ghost0 (e.g., ghost storage object for Drive0) so I/O requests start returning errors on the Node0 path. This may be accomplished, for example, through issuing a stop command through the resource agent for Drive0 on Node0. Next, the cluster software will choose another node to host Drive0. Embodiments of how such choices are made are discussed above. Assume for purposes of this example that Node1 is chosen to host Drive0.

Then, Node1 will be requested to start access to Drive0. This may be accomplished, for example, through issuing a start command through the resource agent for Drive0 on Node1. This requires reprogramming the PCIe switch partitions to attach Drive0 to Node1, and linking Node1's endpoint for Initiator0 to the real storage object for Drive0. These steps allow I/O commands to succeed on Node1.

Finally, the Initiator's multipath software (e.g., the multipath module on Initiator0 will detect the path failure to Node0 and scan other paths for access to Drive0. Eventually it will find a working route to Drive0 via Node1, and that will become the new active data path.

It will be noted with respect to the example depicted in FIGS. 9 and 10 that these examples show a drive attached directly to an endpoint. This is often called disaggregated storage, where the initiator uses drives that are located in a remote storage server. This physical distance may help to manage the storage and compute nodes separately. However, the embodiments as disclosed herein may work equally well for aggregated software modes, where the initiator may connect to a volume (or LUN) that is composed of regions from multiple drives. For example, a volume may stripe data across four physical drives, and the same four drives may be large enough to partition into a number of independent volumes (e.g., on the order of hundreds or more). In certain of these modes, all drives that are used by the volume must be owned by the same node in the storage cluster. Failover and failback events may move that drive set in unison between nodes. Additionally, the ghost storage object would be a ghost volume, where a set of storage objects for those volumes (e.g., ghost volumes) are attached/detached to their corresponding endpoint during failover/failback events.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more I/O device(s). The I/O devices can include a keyboard, monitor, printer, electronic pointing device (such as a mouse, trackball, stylus, etc.), or the like. In various embodiments, the computer has access to at least one database over the network.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion.

For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

In the foregoing specification, the invention has been described with reference to specific embodiments. However, one of ordinary skill in the art appreciates that various modifications and changes can be made without departing from the scope of the invention as set forth. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A high availability (HA) storage cluster, comprising
   a switch;
   a set of storage resources coupled to a set of hosts and coupled to the switch via a first network; and
   a set of nodes coupled via a second network to the switch, each node including an HA module thereon, the HA module at a first node maintaining:
      a real storage object representing a corresponding storage resource, wherein the real storage object is configured with a namespace identifier for the corresponding storage resource and the real storage object provides an interface for accessing the corresponding storage resource;
      a ghost storage object corresponding to the real storage object and the storage resource, wherein the ghost storage object is configured with the same namespace identifier as the corresponding real storage object, provides the interface, and is configured to return an error in response to a command to the interface when the command is an I/O command and return a valid path when the command is a discovery command, connect command, or namespace ID command, wherein the HA module is configured for:
      when the first node owns the storage resource, associating the real storage object with a host such that receiving a command from the host comprises using the interface of the real storage object to execute the command; and
      when the first node does not own the storage resource, associating the ghost storage object with the host such that when the first node does not own the storage resource receiving the command from the host comprises using the interface of the ghost storage object to return an error when the command is an I/O command and a valid path when the command is a discovery command, connect command, or namespace ID command.

2. The HA storage cluster of claim 1, wherein the HA module is configured for, when the first node does not own the storage resource:
   determining that a second node that owns the storage resource has failed;
   in response to the determination that the second node has failed:
   disassociating the ghost storage object from the host; and
   associating the real storage object for the storage resource with the host such that receiving the command from the host comprises using the interface of the real storage object to execute the command, including returning the valid path in response to the discovery command, connect command, or namespace ID command issued by a multipath module of the host.

3. The HA storage cluster of claim 2, wherein associating the real storage object with the host comprises attaching the real storage object to an endpoint associated with the host, associating the ghost storage object with the host comprises attaching the ghost storage object to the endpoint associated with the host, and disassociating the ghost storage object from the host comprises detaching the ghost storage object from the endpoint associated with the host.

4. The HA storage cluster of claim 3, wherein the storage resources are single-ported NVMe drives.

5. The HA storage cluster of claim 3, wherein the switch is a virtually partitioned switch.

6. The HA storage cluster of claim 5, wherein an HA module of the HA storage cluster is configured for, in response to determining that the second node that owns the storage resource has failed, reconfiguring the switch to assign the storage resource and the first node to a same virtual switch partition.

7. The HA storage cluster of claim 1, wherein the first network and the second network are the same.

8. A method, comprising:
   providing a high availability (HA) module on a first node of a HA storage cluster, the HA storage cluster including a set of storage resources coupled to a set of hosts and coupled to a switch via a first network, and a set of nodes coupled via a second network to the switch, the HA module:
      maintaining a real storage object representing a corresponding storage resource, wherein the real storage object is configured with a namespace identifier for the corresponding storage resource and the real storage object provides an interface for accessing the corresponding storage resource;
      maintaining a ghost storage object corresponding to the real storage object and the storage resource, wherein the ghost storage object is configured with the same namespace identifier as the corresponding real storage object, provides the interface, and is configured to return an error in response to a command to the interface when the command is an I/O command, and wherein the HA module:
  associates the real storage object with a host when the first node owns the storage resource such that receiving a command from the host comprises using the interface of the real storage object to execute the command, including returning a valid path in response to a discovery command, connect command, or namespace ID command issued by a multipath module of the host; and
  associates the ghost storage object with the host when the first node does not own the storage resource such that when the first node does not own the storage resource receiving the command from the host comprises using the interface of the ghost storage object to return an error to the command when the command is an I/O command and a valid path when the command is a discovery command, connect command, or namespace ID command.

9. The method of claim 8, comprising:
  determining that a second node that owns the storage resource has failed when the first node does not own the storage resource;
  in response to the determination that the second node has failed:
    disassociating the ghost storage object from the host; and
    associating the real storage object for the storage resource with the host such that receiving the command from the host comprises using the interface of the real storage object to execute the command, including returning the valid path in response to the discovery command, connect command, or namespace ID command issued by the multipath module of the host.

10. The method of claim 9, wherein associating the real storage object with the host comprises attaching the real storage object to an endpoint associated with the host, associating the ghost storage object with the host comprises attaching the ghost storage object to the endpoint associated with the host, and disassociating the ghost storage object from the host comprises detaching the ghost storage object from the endpoint associated with the host.

11. The method of claim 10, wherein the storage resources are single-ported NVMe drives.

12. The method of claim 10, wherein the switch is a virtually partitioned switch.

13. The method of claim 12, comprising reconfiguring the switch to assign the storage resource and the first node to a same virtual switch partition in response to determining that the second node that owns the storage resource has failed.

14. The method of claim 8, wherein the first network and the second network are the same.

15. A non-transitory computer readable medium, comprising instructions for:
  providing a high availability (HA) module on a first node of a HA storage cluster, the HA storage cluster including a set of storage resources coupled to a set of hosts and coupled to a switch via a first network, and a set of nodes coupled via a second network to the switch, the HA module:
    maintaining a real storage object representing a corresponding storage resource, wherein the real storage object is configured with a namespace identifier for the corresponding storage resource and the real storage object provides an interface for accessing the corresponding storage resource;
    maintaining a ghost storage object corresponding to the real storage object and the storage resource, wherein the ghost storage object is configured with the same namespace identifier as the corresponding real storage object, provides the interface, and is configured to return an error in response to a command to the interface when the command is an I/O command, and wherein the HA module:
      associates the real storage object with a host when the first node owns the storage resource such that receiving a command from the host comprises using the interface of the real storage object to execute the command, including returning a valid path in response to a discovery command, connect command, or namespace ID command issued by a multipath module of the host; and
      associates the ghost storage object with the host when the first node does not own the storage resource such that when the first node does not own the storage resource receiving the command from the host comprises using the interface of the ghost storage object to return an error to the command when the command is an I/O command and a valid path when the command is a discovery command, connect command, or namespace ID command.

16. The non-transitory computer readable medium of claim 15, comprising instructions for:
  determining that a second node that owns the storage resource has failed when the first node does not own the storage resource;
  in response to the determination that the second node has failed:
    disassociating the ghost storage object from the host; and
    associating the real storage object for the storage resource with the host such that receiving the command from the host comprises using the interface of the real storage object to execute the command, including returning the valid path in response to the discovery command, connect command, or namespace ID command issued by the multipath module of the host.

17. The non-transitory computer readable medium of claim 16, wherein associating the real storage object with the host comprises attaching the real storage object to an endpoint associated with the host, associating the ghost storage object with the host comprises attaching the ghost storage object to the endpoint associated with the host, and disassociating the ghost storage object from the host comprises detaching the ghost storage object from the endpoint associated with the host.

18. The non-transitory computer readable medium of claim 17, wherein the storage resources are single-ported NVMe drives.

19. The non-transitory computer readable medium of claim 17, wherein the switch is a virtually partitioned switch.

20. The non-transitory computer readable medium of claim 19, comprising instructions for reconfiguring the switch to assign the storage resource and the first node to a same virtual switch partition in response to determining that the second node that owns the storage resource has failed.

21. The non-transitory computer readable medium of claim 15, wherein the first network and the second network are the same.

\* \* \* \* \*